US012671719B2

(12) United States Patent
Floyd et al.

(10) Patent No.: US 12,671,719 B2
(45) Date of Patent: Jun. 30, 2026

(54) ACTION DETERMINATION FOR MULTI-CATEGORY MODEL

(71) Applicant: The Toronto-Dominion Bank, Toronto (CA)

(72) Inventors: James Floyd, Toronto (CA); Sumit Bansal, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 482 days.

(21) Appl. No.: 18/464,098

(22) Filed: Sep. 8, 2023

(65) Prior Publication Data

US 2025/0088539 A1    Mar. 13, 2025

(51) Int. Cl.
*H04L 29/06*        (2006.01)
*G06F 9/451*        (2018.01)
*H04L 9/40*         (2022.01)

(52) U.S. Cl.
CPC .............. *H04L 63/20* (2013.01); *G06F 9/451* (2018.02)

(58) Field of Classification Search
None
See application file for complete search history.

(56) References Cited

U.S. PATENT DOCUMENTS

| | | | | |
|---|---|---|---|---|
| 7,991,689 | B1 * | 8/2011 | Brunzell | G06Q 40/03 |
| | | | | 705/38 |
| 10,049,349 | B1 * | 8/2018 | Grassadonia | G06Q 20/40 |

| | | | | |
|---|---|---|---|---|
| 10,223,754 | B1 * | 3/2019 | Lopez | G06Q 40/12 |
| 10,255,598 | B1 * | 4/2019 | Dean | G06Q 20/00 |
| 10,366,450 | B1 * | 7/2019 | Mahacek | G06F 3/0488 |
| 10,565,655 | B2 | 2/2020 | Jibowu | |
| 10,586,279 | B1 * | 3/2020 | Ramos | G06Q 30/0269 |
| 10,636,085 | B1 | 4/2020 | Lovett et al. | |
| 10,671,749 | B2 | 6/2020 | Felice-Steel et al. | |

(Continued)

OTHER PUBLICATIONS

Consoli, Sergio et al. Fine-grained, aspect-based semantic sentiment analysis within the economic and financial domains. 2020 IEEE Second International Conference on Cognitive Machine Intelligence (CogMI). https://ieeexplore.ieee.org/stamp/stamp.jsp?tp=&arnumber=9319280 (Year: 2020).*

(Continued)

*Primary Examiner* — Jeremiah L Avery
(74) *Attorney, Agent, or Firm* — Rowand LLP

(57)        ABSTRACT

The present disclosure generally relates to systems, software, and computer-implemented methods for action determination for a multiple-category model. One example method includes establishing secure communication channels with a plurality of systems where data for a user is stored. User data for one or more categories is received via the secure communication channels from the plurality of systems. For each category, a set of rules is applied to the user data for the category to generate a resiliency score for the category for the user. A set of recommended actions is generated for the user based on a comparison of the resiliency score for a category to a threshold score for the category. A dynamic user interface is provided that uses the resiliency scores and the sets of recommended actions to display an interactive resiliency visual with which the user can interact. Machine learning may be applied to generate resiliency scores.

20 Claims, 14 Drawing Sheets

(56) References Cited

U.S. PATENT DOCUMENTS

| | | | | |
|---|---|---|---|---|
| 10,755,355 | B1 | 8/2020 | Ross et al. | |
| 10,802,672 | B2 * | 10/2020 | Kattamanchi | G06F 11/3409 |
| 10,956,879 | B1 * | 3/2021 | Eidson | H04L 67/535 |
| 11,806,241 | B1 * | 11/2023 | Hussain | A61F 2/4455 |
| 11,900,451 | B1 * | 2/2024 | King | G06Q 40/0631 |
| 12,094,018 | B1 * | 9/2024 | O'Malley | G06Q 50/184 |
| 12,533,238 | B2 * | 1/2026 | Hussain | A61F 2/30942 |
| 2007/0143851 | A1 * | 6/2007 | Nicodemus | G06F 11/3495 |
| | | | | 726/4 |
| 2007/0198407 | A1 | 8/2007 | Winter | |
| 2010/0162383 | A1 * | 6/2010 | Linden | G06F 11/2028 |
| | | | | 726/13 |
| 2010/0268629 | A1 | 10/2010 | Ross et al. | |
| 2011/0078073 | A1 * | 3/2011 | Annappindi | G06Q 40/04 |
| | | | | 705/38 |
| 2015/0193872 | A1 * | 7/2015 | Ivanoff | G16H 50/20 |
| | | | | 705/38 |
| 2017/0032459 | A1 | 2/2017 | Kaminski et al. | |
| 2019/0026836 | A1 | 1/2019 | Milkovich et al. | |
| 2020/0074565 | A1 * | 3/2020 | Dotter | G06F 16/907 |
| 2020/0076813 | A1 * | 3/2020 | Felice-Steele | H04L 63/18 |
| 2020/0234185 | A1 * | 7/2020 | Rugel | G06V 40/28 |
| 2021/0142413 | A1 | 5/2021 | Curatola et al. | |
| 2021/0297448 | A1 * | 9/2021 | Keith, Jr. | H04L 63/20 |
| 2023/0005027 | A1 * | 1/2023 | Tietzen | G06Q 20/3829 |
| 2023/0013320 | A1 * | 1/2023 | Eller | G06Q 40/06 |
| 2023/0055277 | A1 * | 2/2023 | Gallardo | G16H 40/20 |
| 2023/0114821 | A1 * | 4/2023 | Thomas | H04L 63/145 |
| | | | | 726/23 |
| 2023/0130840 | A1 * | 4/2023 | Olesen | G06Q 40/03 |
| | | | | 705/38 |
| 2024/0355460 | A1 * | 10/2024 | Sobolewski | G16H 40/20 |
| 2025/0028832 | A1 * | 1/2025 | Thomas | G06F 21/57 |

OTHER PUBLICATIONS

Xu, Pu et al. An improved credit card users default prediction model based on RIPPER. 2017 13th International Conference on Natural Computation, Fuzzy Systems and Knowledge Discovery (ICNC-FSKD). https://ieeexplore.ieee.org/stamp/stamp.jsp?tp=&arnumber=8393037 (Year: 2017).*

Sharma, Shreya et al. Secure and Efficient Federated Transfer Learning. 2019 IEEE International Conference on Big Data (Big Data). https://ieeexplore.ieee.org/stamp/stamp.jsp?tp=&arnumber=9006280 (Year: 2019).*

Rajkumar, R. et al. Intelligent System for Fraud Detection in Online Banking using Improved Particle Swarm Optimization and Support Vector Machine. 2023 8th International Conference on Communication and Electronics Systems (ICCES). https://ieeexplore.ieee.org/stamp/stamp.jsp?tp=&arnumber=10192690 (Year: 2023).*

* cited by examiner

200

Financial Resiliency System

Rule Configuration Engine          202

Resiliency Score Calculator          204

Action Recommender          206

Visualization Generator          208

Connectivity Engine          210

220

| Category 222 231 | Sub-Category 224 | Data Source 226 | Evaluation 228 |
|---|---|---|---|
| Savings | Savings Account 230 | EDW (Enterprise Data Warehouse) | Savings account = True |
| Savings | Auto Deposit Set-up 232 | EDW | PAC (Pre-Authorized Credit) in savings account = True |
| Savings | Consistently Saving 234 | EDW | Total Monthly Savings >= 15% of income |
| Savings | Emergency Funds 236 | EDW | Total Savings Balance >= 3 months of expenses |
| Spending 239 | Spend under Income 238 | EDW | Deposits > Withdrawals |
| Spending | Consistent Spending 240 | EDW | Spending Variation < X% |
| Spending | Autopayments Set-up 242 | EDW | Bill Payment = True |
| Spending | No Waste Spending 244 | EDW | Overdraft fees, late payment fees, credit interest payment = False |
| Planning 247 | Explore Insurance Needs 246 | Financial Advisor | Financial Advisor Confirms |
| Planning | Has Investments 248 | Financial Advisor | Financial Advisor Confirms |
| Planning | Financial Risk Survey 250 | Financial Advisor | Risk Assessment = True |
| Planning | Long Term Savings 252 | EDW | TFSA (Tax Free Savings Account) or RRSP (Registered Retirement Savings Plan) = True |
| Borrowing 257 | Credit Card Account 254 | EDW | Credit Card Account = True |
| Borrowing | Line of Credit 256 | EDW | Line of Credit Account = True |
| Borrowing | Low Credit Utilization 258 | Credit Bureau, EDW | 1% < Credit Utilization <30% |
| Borrowing | Manageable Debt 260 | Credit Bureau, EDW | Debt Service < X% |

FIG. 2B

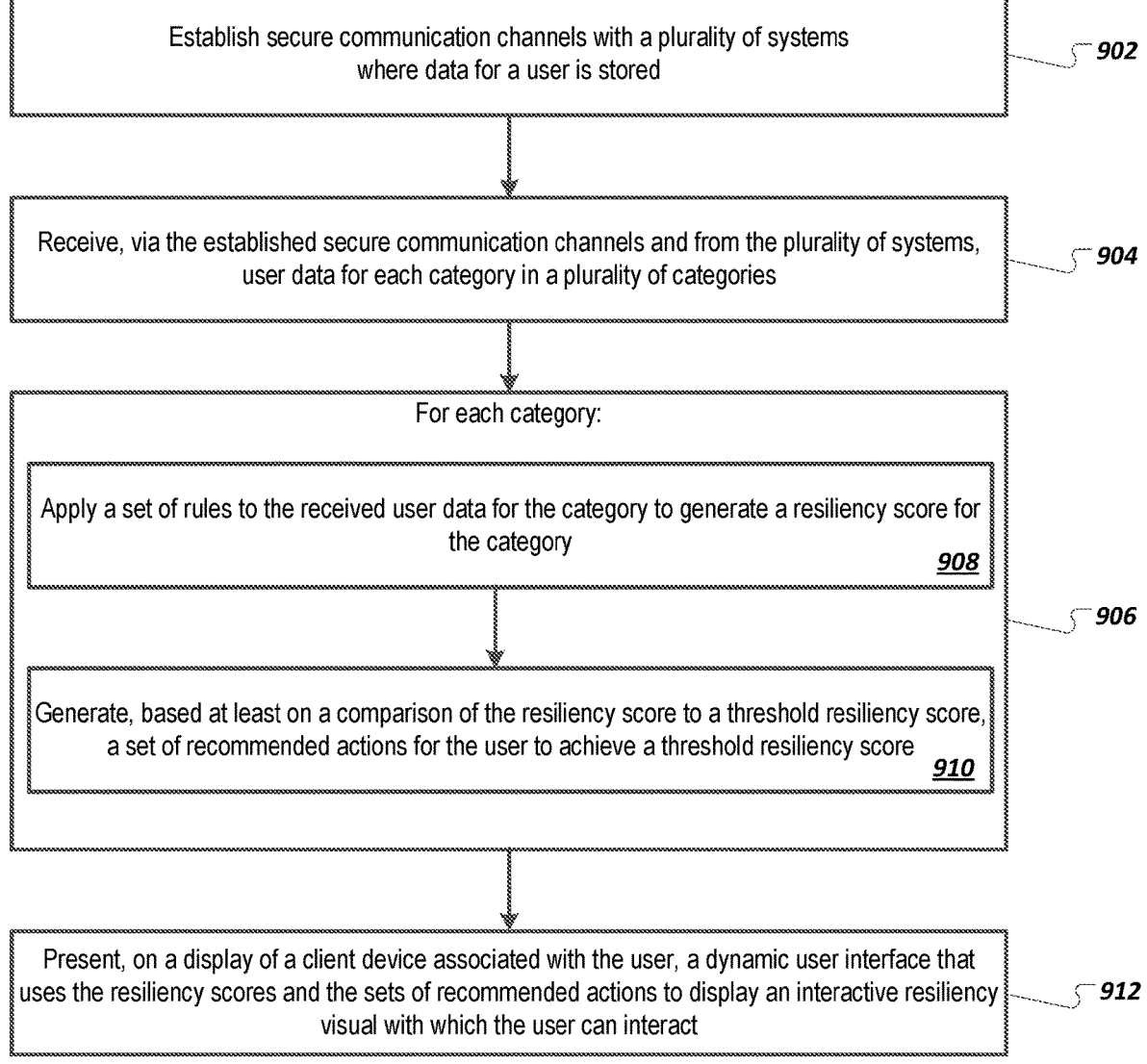

Establish secure communication channels with a plurality of systems where data for a user is stored — 902

Receive, via the established secure communication channels and from the plurality of systems, user data for each category in a plurality of categories — 904

For each category:

Apply a set of rules to the received user data for the category to generate a resiliency score for the category    908

Generate, based at least on a comparison of the resiliency score to a threshold resiliency score, a set of recommended actions for the user to achieve a threshold resiliency score    910

— 906

Present, on a display of a client device associated with the user, a dynamic user interface that uses the resiliency scores and the sets of recommended actions to display an interactive resiliency visual with which the user can interact — 912

ACTION DETERMINATION FOR MULTI-CATEGORY MODEL

TECHNICAL FIELD

The present disclosure generally relates to data processing techniques and provided computer-implemented methods, software, and systems for action determination for a multi-category model.

BACKGROUND

A service provider may offer multiple services using multiple systems. Each system can be implemented with appropriate security to allow only authorized users or systems access to a respective system. To gain access to a system, a secure communication channel can be established with the system.

SUMMARY

The present disclosure generally relates to systems, software, and computer-implemented methods for action determination for a multi-category model and corresponding visualizations.

A first example method includes establishing secure communication channels with a plurality of systems where data for a user is stored; receiving, via the secure communication channels and from the plurality of systems, user data for one or more categories in a plurality of categories; for each category: applying a set of rules to the user data for the category to generate a resiliency score for the category; and generating, based at least on a comparison of the resiliency score to a threshold resiliency score for the category, a set of recommended actions for the user to achieve the threshold resiliency score for the category; and providing, for display on a client device associated with the user, a dynamic user interface that uses the resiliency scores and the sets of recommended actions to display an interactive resiliency visual with which the user can interact.

Implementations can optionally include one or more of the following features. A selection of a recommended action can be received from the dynamic user interface. A request to perform a system action corresponding to the selected recommended action can be transmitted, in response to receiving the selection of the recommended action, from the client device and to a particular system. The transmitting can be performed over a pre-existing secure communication channel. A confirmation that the system action has been completed can be received from the particular system. The confirmation can include data corresponding to the system action. In response to receiving the confirmation that the system action has been completed, updated resiliency scores and updated sets of recommended actions for respective categories can be computed. The dynamic user interface can be dynamically updated based on the updated resiliency scores and updated sets of recommended actions. The dynamic user interface can include a series of user interfaces. A first user interface can include a graphical visualization of a holistic well-being of the user in the plurality of categories. A second user interface can include information corresponding to subcategories for a particular category. A third user interface can include information including the set of recommendations for achieving well-being in the particular category. The second user interface can be activated and presented upon a received user selection of a particular category in the graphical visualization including the plurality of categories. The third user interface can be activated and presented upon a received user selection of a particular subcategory from among subcategories for the particular category. The first user interface can include a plurality of category symbols displaced around a shape with multiple vertices, where the closer a respective vertex is to a respective category symbol, the higher a wellbeing of the user in a respective category corresponding to the category symbol. The plurality categories can include a plurality of financial categories. The plurality of financial categories can include spending, savings, borrowing, and planning.

Similar operations and processes associated with each example system can be performed in different systems comprising at least one processor and a memory communicatively coupled to the at least one processor where the memory stores instructions that when executed cause the at least one processor to perform the operations. Further, a non-transitory computer-readable medium storing instructions which, when executed, cause at least one processor to perform the operations can also be contemplated. Additionally, similar operations can be associated with or provided as computer-implemented software embodied on tangible, non-transitory media that processes and transforms the respective data, some or all of the aspects can be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

The techniques described herein can be implemented to achieve the following advantages. First, the present invention provides an improved user interface for an electronic device of a user that holistically provides, in a single user interface, an overview of user information in different categories and selectable category symbols to enable the user to view more detailed category-specific information and interactive recommendations for a specific category. Second, the interactive recommendations, when selected, cause action instructions to be sent to a system over same secured communication channels used to gather user data for determining the overview, the category-specific information, and the interactive recommendations, thereby saving computing resources as compared to approaches that require re-establishing secure communication channels. Third, the interactive recommendations can include recommended actions along with corresponding links that enable the user to request an action without navigating to a different user interface, thereby saving computing resources as compared to approaches that require a user to launch and use different user interfaces. Fourth, a visualization that presents a holistic view of a user's financial wellbeing can be provided to a financial advisor of the user to facilitate improved financial advising by the advisor. Fifth, financial resiliency scores can be computed for a user based on aggregate financial data that has been securely retrieved for the user from a variety of disparate financial systems over secure communication channels. Sixth, the visualization can be provided to avoid the user or a financial advisor from separately accessing multiple disparate financial systems.

DESCRIPTION OF DRAWINGS

FIG. 2B is a table that illustrates rule evaluation for categories and sub-categories.

FIG. 9 is a flow diagram of an example method for generating and providing a visualization for presenting financial resiliency information.

DETAILED DESCRIPTION

Figure 1:
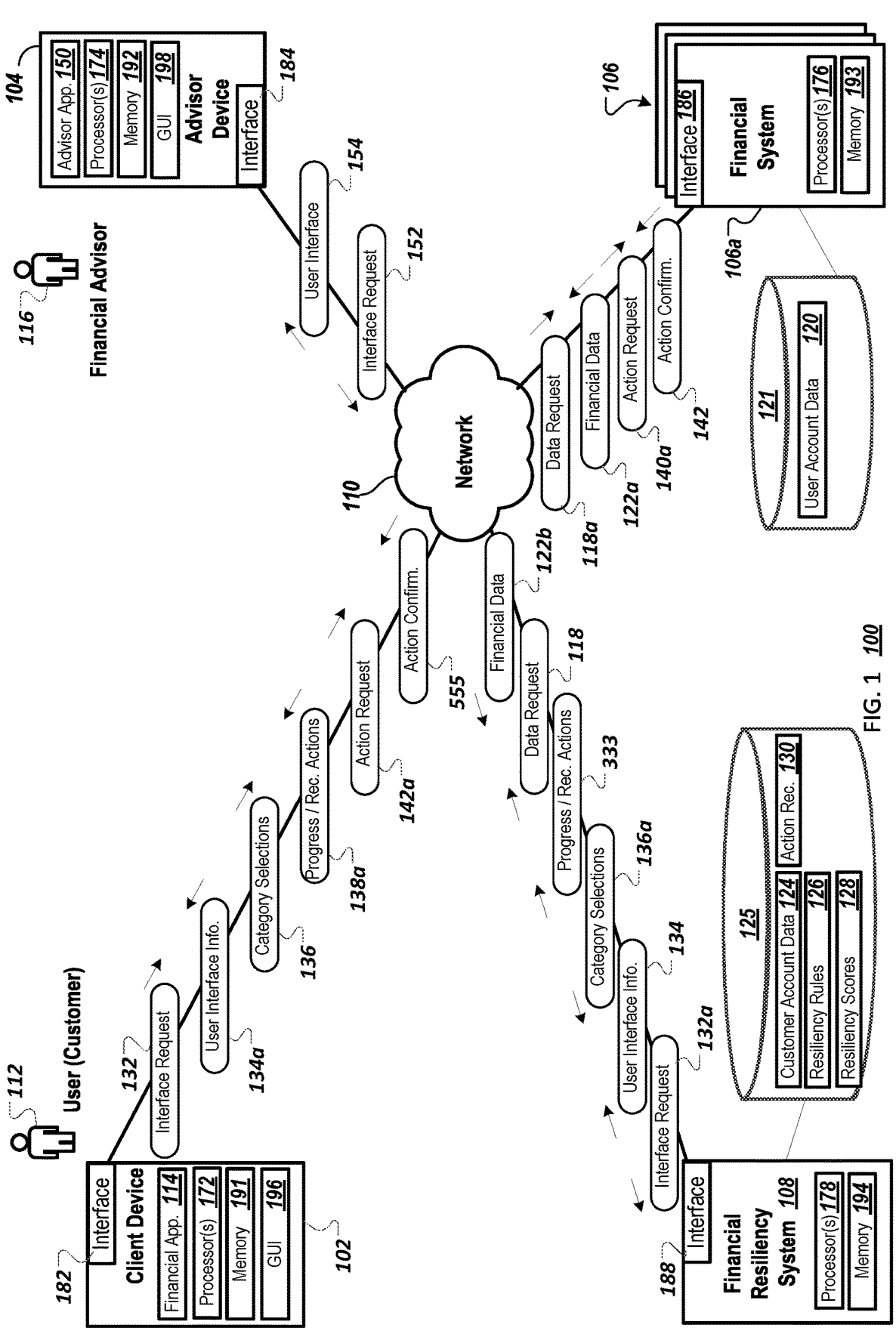
FIG. 1 is a block diagram of a networked environment for a financial resiliency model and corresponding visualizations.

The present disclosure generally relates to action determination for a multi-category model and corresponding visualizations. The descriptions provided herein can be applicable in the context of multi-category models that are used in financial resiliency modeling. However, one skilled in the art will appreciate that the techniques described herein can be applicable in various applications. However, for ease of description, the below disclosure is provided in the context of models used for evaluating and acting on financial resiliency. Current financial health/well-being assessment systems/solutions do not model an individual or entity's holistic financial wellbeing or educate the customer about their financial health. Moreover, data for enabling the holistic wellbeing modeling is often stored on disparate systems (often dispersed over a network, e.g., separate spending, income, savings, borrower accounts at separate financial institutions) without any readily available connection or mechanism for linking such data to facilitate the holistic modeling. As a result, financial advisors typically spend a significant amount of time manually compiling and processing customer information to determine the customer's financial situation and to thereafter generation recommendations or advice regarding how to improve the customer's financial wellbeing.

To solve these problems, the technical solution described herein provides an application that facilitates secure connections to multiple different financial or third party systems, and exchange of sensitive data via these systems. Based on the received data, the application performs a series of computations to determine financial health/resiliency of the customer in various categories (e.g., spending, savings, borrowing, and planning). Categories may represent main aspects or pillars of a customer's financial well-being, for example. Using the categorical computations, the application generates a set of visuals/user interfaces that provide an outlook of the customer's financial resiliency/health with respect to the various categories.

Use of the claimed solution can achieve various significant technical advantages and efficiencies. For instance, the claimed solution can provide targeted and focused resources (e.g., educational resources) and recommendations (product recommendations or action recommendations) that are customized to the customer's needs and financial situation. The solution can thereby avoid the numerous computing resources that may otherwise be consumed in generating and transmitting over a network, generic resources and product/action recommendations that are often not tailored or even suitable to a customer's needs.

Additionally, as summarized here and described in more detail below, the technical solution can be used in various use cases. For example, the technical solution can be deployed as part of a customer-accessible financial platform that provide recommendations to customers and provide self-help controls and resources to facilitate the customer himself/herself achieve financial resiliency. As another example, the solution can also be used to determine target communications to send to customers, with offers, resources, and recommendations of actions, products, and/or services for the customer to pursue. Financial resiliency scores can be used similar to credit scores, for example, as a measure of potential customers' worthiness in terms of lending, offers, products, etc. Financial resiliency scores can be used within an organization or can be distributed for use by different organizations, such as by a national agency. As yet another example, the solution can also be used as an assistance tool for financial advisors to generate recommendations and actions their customers should take.

Turning to the illustrated example implementation, FIG. 1 is a block diagram of a networked environment 100 for a financial resiliency model and corresponding visualizations. As shown in FIG. 1, the example environment 100 includes a client device 102, an advisor device 104, various financial systems 106 including a financial system 106*a*, a financial resiliency system 108, and a network 110. The function and operation of each of these components is described below.

A user (e.g., customer) 112 of a financial institution can access systems of the financial institution using a financial application 114 on the client device 102. The financial institution may wish to help the user 112 achieve financial resiliency by offering various products and services (e.g., financial products, financial advising). For example, a financial advisor 116 can provide financial advising services to the user 112 (and other customers). The financial advisor 116 may interact with systems of the financial institution using the advisor device 104.

However, both the user 112 and the financial advisor 116 may not know a complete financial picture of the user 112 for modeling customer financial wellbeing, due to the user 112 having data at multiple of the financial systems 106, for example. Challenges can occur, for example, because customer data that might enable holistic wellbeing modeling may be stored on disparate systems of the financial systems 106 (which may be dispersed over the network 110 or other networks), and may include separate spending, income, savings, borrower accounts at separate financial institutions without any readily available connection or mechanism for linking such disparate customer data to facilitate holistic modeling. Accordingly, the user 112 may not have a complete financial picture of their financial wellbeing and/or the financial advisor 116 may be required to spend a significant amount of time manually compiling and processing customer information from disparate sources (assuming the financial advisor 116 has access to such systems or data) to determine the user's financial situation to generate recommendations or advice regarding how to improve the user's financial wellbeing.

The solutions described herein, however, can enable automatic generation of a holistic view of the financial wellbeing of the user 112, thereby improving financial resiliency of the user 112 through data transparency, connectivity, recommendations, and action monitoring. For example, the financial resiliency system 108 can establish a secure communication channel with each financial system 106 which stores data for the user 112. In some cases, secure channels can be established using open banking protocols using authorization information stored for the user 112 and based on prior user consent for using open banking protocols to connect to one or more financial systems 106. After a secure communication channel has been established with a respective financial system 106 such as the financial system 106a, the financial resiliency system 108 can send a data request 118 for customer data for the user 112 to the respective financial system 106.

For example, the financial system 106a can receive a data request 118a from the financial resiliency system 108. The financial system 106a, for example, can, in response to the data request 118a, identify and retrieve customer data for the user 112, such as from user account data 120 in a repository 121 stored or accessible by the financial system 106a. The financial system 106a can send financial data 122a for the user 112 to the financial resiliency system 108, in response to the data request 118a. The financial resiliency system 108 can receive, over the secured communication channel, the financial data 122a as financial data 122b and store the financial data 122b in customer account data 124 in association with the user 112 in a repository 125 included in or accessible by the financial resiliency system 108. The customer account data 124 can include customer data for the user 112 that has been received from multiple financial institutions, for example. The customer account data 124 can include data corresponding to a number of different financial categories, such as borrowing, spending, savings, and planning. Other categories are possible. In some cases, customer account data 124 includes information received from an open banking aggregator.

Based on the received customer account data 124 for the user 112, the financial resiliency system 108 can perform a series of computations to determine financial health/resiliency of the user 112 in the different financial categories of data included in the customer account data 124. For example, the financial resiliency system 108 can, for each financial category, apply a set of resiliency rules 126 for the financial category to the customer account data 124 of the financial category to generate a financial resiliency score for the financial category. Financial resiliency scores for different financial categories can be stored for the user 112 as resiliency scores 128.

The financial resiliency system 108 can also, for each financial category for the user 112, based at least on a comparison of the financial resiliency score of the financial category to a threshold financial resiliency score, generate and store a set of recommended actions 130 for the user 112 to achieve a threshold financial resiliency score for the financial category.

The financial resiliency system 108 can be configured to generate, in response to a request from the user 112, a set of visuals/user interfaces that provide an outlook of the financial resiliency/health of the customer with respect to the various financial categories. For instance, the client device 102 can send an interface request 132 to the financial resiliency system 108 in response to a user interaction of the user 112 in the financial application 114. The user interaction may be a request to launch or download the financial application 114 or to select a user interface control that is configured to launch a financial resiliency interface portion of the financial application 114, for example.

The financial resiliency system 108 can receive the interface request 132 over the network 110 as an interface request 132a. In response to receiving the interface request 132a, the financial resiliency system 108 can generate user interface information 134 that defines a dynamic user interface that uses the resiliency scores 128 and the recommended actions 130 for the user 112 to display interactive financial resiliency visuals with which the user 112 can interact. Example user interfaces are shown and described with respect to FIGS. 3 to 8.

Figure 3:
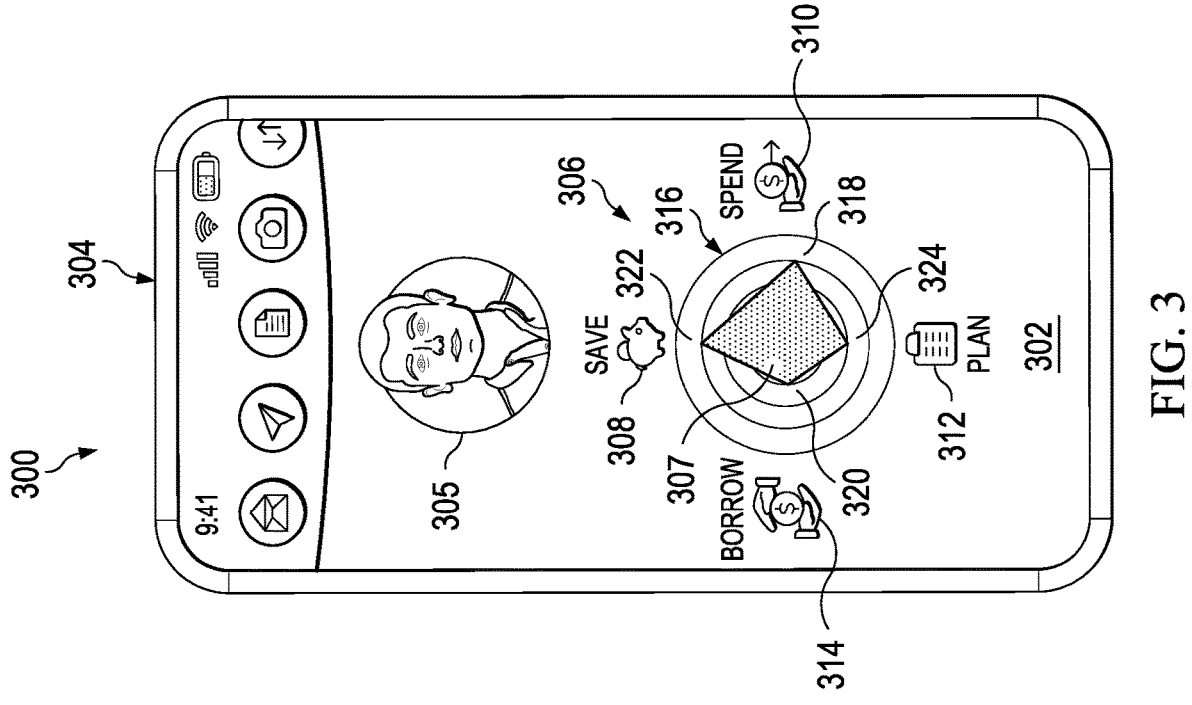
FIG. 3 is a diagram that illustrates the displaying of an example user interface of an example application.
Figure 4:
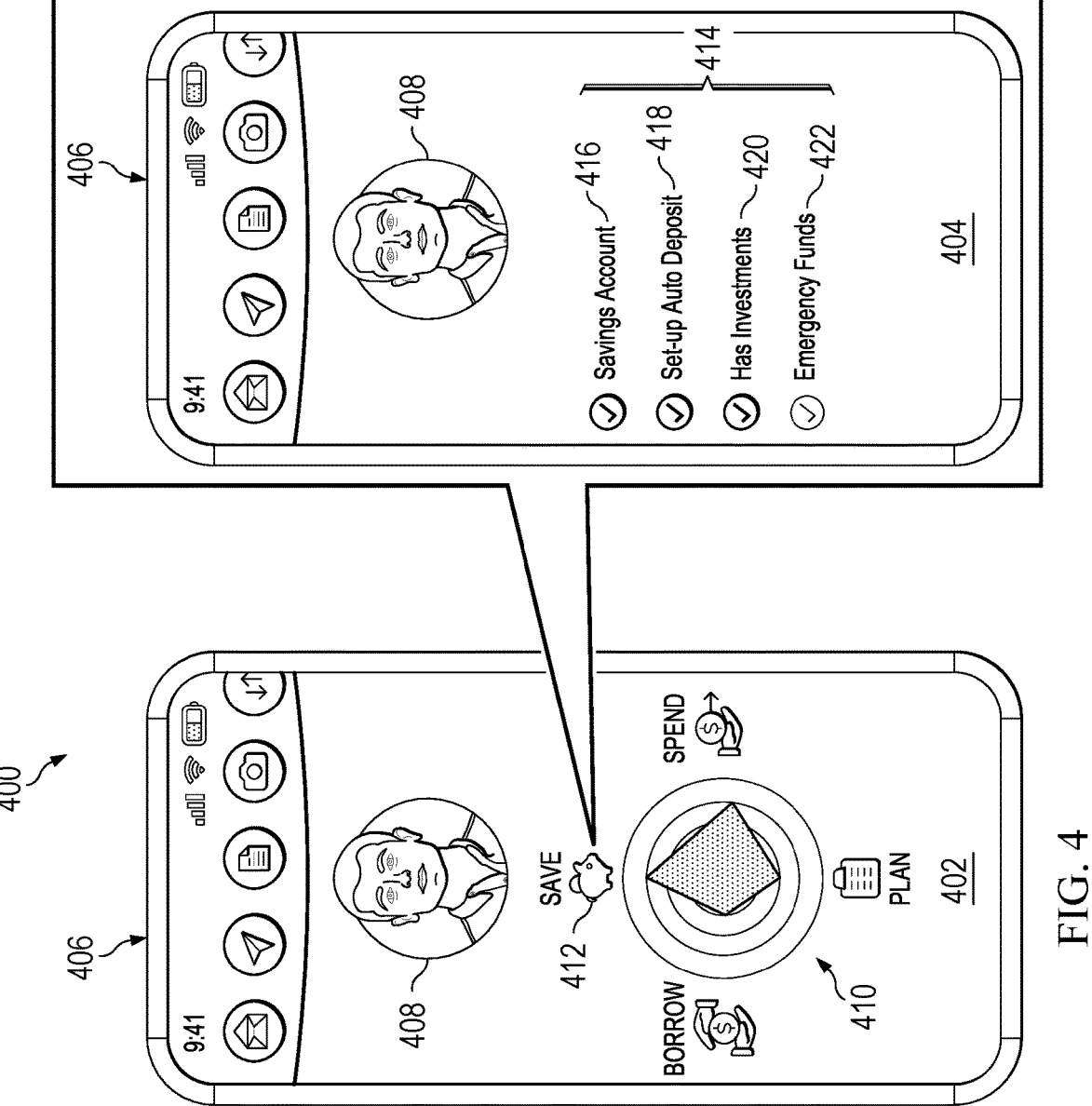
FIGS. 4-8 are diagrams that illustrate progressions of example interactive user interfaces of an example application.

As an example, a first user interface (e.g., as shown in FIG. 3) can include a graphical visualization of a holistic financial well-being of the customer in the different financial categories (e.g., based on the resiliency scores 128). A second user interface (e.g., as shown in FIG. 4) can include information corresponding to subcategories for a particular financial category. A third user interface (e.g., as shown in FIGS. 5-8) can include information including the recommended actions 130 for achieving financial well-being in a category (e.g., as a specific action to take regarding a selected subcategory of the category).

In some implementations, the second user interface can be activated and presented upon a received user selection of a particular category displayed in the first user interface. As another example, in some implementations, the third user interface can be activated and presented upon a received user selection of a particular subcategory displayed in the second user interface. The user interface information 134 may include definition of the first, second, and third user interfaces, or may include a definition of the first user interface, with user interface information for the second and third user interfaces generated and provided in response to subsequent user interactions and client device 102 requests.

One or more of the visuals in the dynamic user interface can include link(s) that can be selected to initiate a recommended action 130. The dynamic user interface can include links that facilitate taking action on a recommendation without requiring the user 112 to navigate away from the financial application 114, for example. The user interface information 134 can be provided to the client device 102, over the network 110, in response to the interface request 132. The client device 102 can receive the user interface information 134 as a user interface information 134a. The user interface information 134a can be used to present the dynamic user interface (e.g., in or as the financial application 114, or in another application). As described above, the dynamic user interface can be interactive, and the user 112 can progress through different visuals, from an overview visual, to a category-specific interface, to a sub-category interface that includes recommendations (to name a few example interactions). Accordingly, different requests, based on user selections, can be provided to the financial resiliency system 108. For example, category selections 136 can be provided, by the client device 102, over the network 110, to the financial resiliency system 108. The category selections 136 can be a selection of a main category (e.g., on the first user interface), or a selection of a subcategory (e.g., on the second user interface).

The financial resiliency system 108 can receive the category selections 136 as category selections 136a. The financial resiliency system 108 can, in response to a category or subcategory selection included in the category selections 136a, generate or retrieve response information based on the category or subcategory selection. For example, in response to a category selection, the financial resiliency system 108 can identify subcategories associated with the category and progress of the user 112 in reaching financial resiliency (e.g., as compared to a threshold) for each subcategory. For instance, FIG. 4 illustrates subcategories of a selected category and user progress with regards to each subcategory. In some cases, in response to a category selection, the financial resiliency system can identify, in the recommended actions 130, one or more recommendations for the selected category.

As another example, in response to a subcategory selection (e.g., on the second user interface), the financial resiliency system 108 can identify, in the recommended actions 130, one or more recommendations for the selected subcategory. Additionally, the financial resiliency system 108 can generate and/or identify progress information for the user with respect to the selected subcategory (e.g., in reference to a threshold defined for the subcategory).

After identifying or generating progress information and/or action recommendations for a selected category or subcategory, the financial resiliency system 108 can send the progress information and/or information for the recommended action(s) (e.g., as progress information/recommended actions 138) to the client device 102, over the network, for example, as information to present in the dynamic user interface or as a next page of the dynamic user interface. The client device 102 can receive the progress information/recommended actions 138 as progress/recommended actions 138a. The dynamic user interface can be updated to present the progress and/or recommended action information in the progress/recommended actions 138a.

The user 112 can further drill down into subcategories of a selected category, select a different category, or in some cases, select a sub-subcategory, in the dynamic user interface. As another example, when the dynamic user interface displays a recommended action, the user 112 can select a link that is configured to invoke an API (Application Programming Interface) to perform a respective recommended action 130. In some cases, selection of the link can invoke functionality associated with the financial application (e.g., taking the user 112 to another portion of the financial application that can be used to complete the action). In other cases, invoking the API involves prompting the user to log in to an account at a financial institution 106.

For instance, selection of the link by the user 112 can result, in some cases, in an action request 140 being sent from the client device 102, over the network 110, to a respective financial system 106. For instance, the financial system 106a can receive the action request 140 as an action request 140a. The financial system 106a can perform an action specified in the action request 140a, such as opening an account for the user 112, performing a transaction with respect to an account of the user 112, or performing some other action. The financial system 106a can send an action confirmation 142, over the network 110, to the client device 102. The client device can receive the action confirmation 142, as an action confirmation 142a, and update the dynamic user interface in response to the action confirmation 142a. Although action requests are described as being sent to a financial system 106, in some cases, an action request may be sent to the financial resiliency system 108, and the financial resiliency system 108 may perform an action on behalf of the user 112 (which could involve communication with a financial system 106 or with another system).

In some cases, the financial system 106a sends an action confirmation or other information to the financial resiliency system 108 after performance of an action. Accordingly, the financial resiliency system 108 can compute updated resiliency scores 128 (and in some cases, updated recommended actions) in response to the user 112 having performed an action with respect to a given financial category. The financial resiliency system can send updated user interface information (or updated resiliency scores, as appropriate) to the client device 102.

The dynamic user interface being displayed by the client device 102 can represent a live representation of financial resilience of the user 112. For instance, the dynamic user interface can be updated to reflect the updated resiliency scores and/or updated recommended actions. For example, the dynamic user interface can be dynamically updated to reflect an improved financial wellbeing of the user 112 that has been improved as a result of the user triggering performance of an action. As another example, the dynamic user interface can automatically update in general as financial information for the user 112 (e.g., savings, investments, credit limit) changes based on updated financial data received from the financial systems 106.

In some cases, the financial resiliency system 108 determines that an action has been performed for the user 112 as part of a next iteration of sending the data request 118 and receiving the financial data 122b. In general, the financial resiliency system 108 can update the resiliency scores 128 over time, based on current customer account data 124, and use updated resiliency scores 128 to generate updated dynamic user interfaces for the user 112.

In some implementations, the financial resiliency system can also provide dynamic user interfaces to the advisor device 104 for viewing by the financial advisor 116, to facilitate improved advising by enabling the financial advisor 116 to view a holistic visualization of the user 112 for which the financial advisor 116 is providing advice. For instance, in response to a user input from the financial advisor 116 (e.g., in an advisor application 150), the advisor device 104 can send an interface request 152 to the financial resiliency system 108, for the user 112. The financial resiliency system 108 can determine that the financial advisor 116 is authorized to view financial information of the user 112 and can generate and provide a dynamic user interface, which may the same as or similar to the dynamic user interface presented on the client device 102. The dynamic user interface generated for the financial advisor 116 could be an advisor-specific view but which includes similar visualizations as those shown to the user 112 that show a holistic view of the financial wellbeing of the user 112 along with category-specific information. The advisor dynamic user interface can thus help the advisor 116 prepare for appointments with the user 112 and improve provided advice.

User interface information 154 can be received by the advisor device 104, for presentation of an advisor dynamic user interface (e.g., in or as the advisor application 150). The advisor dynamic user interface can be used as an assistance tool for the financial advisor 116 to generate further recommendations for the user 112 other than those already shown to the user, or for the financial advisor to select and encourage the user 112 to act on particular recommendations previously displayed in dynamic user interfaces to the user 112 and the financial advisor 116. Although not shown in FIG. 1, in some implementations, the environment 100 includes one or more administrator devices that can be used to configure rules and/or thresholds used by the financial resiliency system 108 (e.g., as described in more detail below with respect to FIG. 2).

As used in the present disclosure, the term "computer" is intended to encompass any suitable processing device. For example, the client device 102, advisor device 104, the financial systems 106, and the financial resiliency system 108 can be any computer or processing devices such as, for example, a blade server, general-purpose personal computer (PC), Mac®, workstation, UNIX-based workstation, or any other suitable device. Moreover, although FIG. 1 illustrates a single client device 102 and a single advisor device 104, the environment 100 can be implemented using more than those illustrated, as well as including computers other than servers, including a server pool. The present disclosure can include computers other than general-purpose computers, as well as computers without conventional operating systems.

The client device 102 can be any system that can request data and/or interact with the financial resiliency system 108 and the financial systems 106. The client device 102, in some instances, can be a desktop system, a client terminal, or any other suitable device, including a mobile device, such as a smartphone, tablet, smartwatch, or any other mobile computing device. In general, each illustrated component can be adapted to execute any suitable operating system, including Linux, UNIX, Windows, Mac OS®, Java™, Android™, Windows Phone OS, or iOS™, among others. The client device 102 can include, as discussed, the financial application 114 and one or more web browsers or web applications that can interact with particular applications executing remotely from the client device 102.

As illustrated, the client device 102, the advisor device 104, the financial system 106a, and the financial resiliency system 108 respectively include processor(s) 172, 174, 176, or 178. In some cases, multiple processors can be used according to particular needs, desires, or particular implementations of a respective device included in the environment 100. Each processor of the processor(s) 172, 174, 176, and 178 can be a central processing unit (CPU), an application specific integrated circuit (ASIC), a field-programmable gate array (FPGA), or another suitable component. Generally, each processor of the processor(s) 172, 174, 176, and 178 executes instructions and manipulates data to perform the operations of the respective corresponding computing device. Specifically, the processor(s) 172, 174, 176, and 178 can execute the algorithms and operations described in the illustrated figures, as well as the various software modules and functionality described herein. Each processor of the processor(s) 172, 174, 176, and 178 can have a single or multiple cores, with each core available to host and execute an individual processing thread. Further, the number of, types of, and particular processors used to execute the operations described herein can be dynamically determined based on a number of requests, interactions, and operations associated with the environment 100.

Interface 182, 184, 186, and 188 of the client device 102, the advisor device 104, the financial system 106a, and the financial resiliency system 108 can be used for communicating with other systems in a distributed environment— including within the environment 100—connected to the network 110. Generally, each interface 182, 184, 186, and 188 comprises logic encoded in software and/or hardware in a suitable combination and operable to communicate with the network 110 and other components. More specifically, each interface 182, 184, 186, and 188 can comprise software supporting one or more communication protocols associated with communications such that the network 110 and/or interface's hardware is operable to communicate physical signals within and outside of the illustrated environment 100. Still further, each interface 182, 184, 186, and 188 can allow the client device 102, the advisor device 104, the financial system 106a, or the financial resiliency system 108, respectively, and/or other portions illustrated within the environment 100 to perform the operations described herein.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component can be fully or partially written or described in any appropriate computer language including, e.g., C, C++, JavaScript, Java™, Visual Basic, assembler, Perl®, any suitable version of 4GL, as well as others.

As illustrated, the client device 102, the advisor device 104, the financial system 106a, and the financial resiliency system 108 respectively include memory 191, 192, 193, or 194. Each memory 191, 192, 193, and 194 can represent a single memory or multiple memories. Each memory 191, 192, 193, and 194 can include any memory or database module and can take the form of volatile or non-volatile memory including, without limitation, magnetic media, optical media, random access memory (RAM), read-only memory (ROM), removable media, or any other suitable local or remote memory component. Each memory 191, 192, 193, and 194 can store various objects or data associated with the respective corresponding computing device, including any parameters, variables, algorithms, instructions, rules, constraints, or references thereto.

Network 110 facilitates wireless or wireline communications between the components of the environment 100, as well as with any other local or remote computers, such as additional mobile devices, clients, servers, or other devices communicably coupled to network 110, including those not illustrated in FIG. 1. In the illustrated environment, the network 110 is depicted as a single network, but can be comprised of more than one network without departing from the scope of this disclosure, so long as at least a portion of the network 110 can facilitate communications between senders and recipients. In some instances, one or more of the illustrated components can be included within or deployed to network 110 or a portion thereof as one or more cloud-based services or operations. The network 110 can be all or a portion of an enterprise or secured network, while in another instance, at least a portion of the network 110 can represent a connection to the Internet. In some instances, a portion of the network 110 can be a virtual private network (VPN). Further, all or a portion of the network 110 can comprise either a wireline or wireless link. Example wireless links can include 802.11a/b/g/n/ac, 802.20, WiMax, LTE, and/or any other appropriate wireless link. In other words, the network 110 encompasses any internal or external network, networks, sub-network, or combination thereof operable to facilitate communications between various computing components inside and outside the illustrated environment 100. The network 110 can communicate, for example, Internet Protocol (IP) packets, Frame Relay frames, Asynchronous Transfer Mode (ATM) cells, voice, video, data, and other suitable information between network addresses. The network 110 can also include one or more local area networks (LANs), radio access networks (RANs), metropolitan area networks (MANs), wide area networks (WANs), all or a portion of the Internet, and/or any other communication system or systems at one or more locations.

As illustrated, one or more client devices 102 can be present in the example environment 100. Although FIG. 1 illustrates a single client device 102, multiple clients can be deployed and in use according to the particular needs, desires, or particular implementations of the environment 100. Each client device 102 can be associated with a particular user (e.g., a user who may acquire an item via interactions with the client device 102), or can be associated with/accessed by multiple users, where a particular user is associated with a current session or interaction at the client device 102. The client device 102 can be a client device at which the user is linked or associated.

The illustrated client device 102 and the advisor device 104 are each intended to encompass any computing device, such as a desktop computer, laptop/notebook computer, mobile device, smartphone, personal data assistant (PDA), tablet computing device, one or more processors within these devices, or any other suitable processing device. In general, the client device 102 and the advisor device 104 and their components can be adapted to execute any operating system. In some instances, the client device 102 and/or the advisor device 104 can be a computer that includes an input device, such as a keypad, touch screen, or other device(s) that can interact with one or more client applications, such as one or more mobile applications, including for example a web browser, a banking application, or other suitable applications, and an output device that conveys information associated with the operation of the applications and their application windows to the user of the client device 102 or advisor device 104, respectively. Such information can include digital data, visual information, or a GUI (Graphical User Interface) 196 (as shown with respect to the client device 102) or GUI 198 (as shown with respect to the advisor device 104). Specifically, the client device 102 and the advisor device 104 can each be any computing device operable to communicate with other components via network 110, as well as with the network 110 itself, using a wireline or wireless connection. In general, the client device 102 and the advisor device 104 each comprise an electronic computer device operable to receive, transmit, process, and store any appropriate data associated with the environment 100 of FIG. 1.

The financial application 114 executing on the client device 102 can be or include any suitable application, program, mobile app, or other component. The financial application 114 can interact with the financial systems 106, the financial resiliency system 108, and/or other client(s), or portions thereof, via network 110. In some instances, the financial application 114 can be a web browser, where the functionality of the financial application 114 can be realized using a web application or website that the user can access and interact with via the financial application 114. In other instances, the financial application 114 can be a remote agent, component, or client-side version of a corresponding server application provided by the financial resiliency system 108. In some instances, the financial application 114 can interact directly or indirectly (e.g., via a proxy server or device) with the financial systems 106, the financial resiliency system 108, or portions thereof.

The GUI 196 of the client device 102 interfaces with at least a portion of the environment 100 for any suitable purpose, including generating a visual representation of the financial application 114 and/or a web browser, for example. For instance, the GUI 196 can be used to present screens for financial resiliency information and recommendations and interactions associated therewith. The GUI 196 can also be used to view and interact with various web pages, applications, and web services located local or external to the client device 102. Generally, the GUI 196 provides the user with an efficient and user-friendly presentation of data provided by or communicated within the system. The GUI 196 can comprise a plurality of customizable frames or views having interactive fields, pull-down lists, and buttons operated by the user. In general, the GUI 196 is often configurable, supports a combination of tables and graphs (bar, line, pie, status dials, etc.), and is able to build real-time portals, application windows, and presentations. Therefore, the GUI 196 contemplates any suitable graphical user interface, such as a combination of a generic web browser, a web-enable application, intelligent engine, and command line interface (CLI) that processes information in the platform and efficiently presents the results to the user visually.

While portions of the elements illustrated in FIG. 1 are shown as individual components that implement the various features and functionality through various objects, methods, or other processes, the software can instead include a number of sub-modules, third-party services, components, libraries, and such, as appropriate. Conversely, the features and functionality of various components can be combined into single components as appropriate.

Figure 2A:
FIG. 2A is a block diagram of an example financial resiliency system.

FIG. 2A is a block diagram of an example financial resiliency system 200. The financial resiliency system 200 can be the financial resiliency system 108 described above with respect to FIG. 1. The financial resiliency system 200 includes a rule configuration engine 202, a resiliency score calculator 204, an action recommender 206, a visualization generator 208, a connectivity engine 210, and an event detector 212. Each of these described components of the financial resiliency system 200 includes programming instructions that, upon execution by a processor or another data processing apparatus, perform tasks that are described as being performed by the respective component (as further described below).

The rule configuration engine 202 can enable definition (e.g., by an administrator) of rules for determining resiliency scores for different financial categories. Additionally, the rule configuration engine 202 can enable definition of thresholds for resiliency scores for meeting satisfactory process for different financial categories. The rule configuration engine 202 can provide one or more interfaces (e.g., user interfaces, file input interfaces, API interfaces) for accepting rules and/or thresholds. Additionally, the rule configuration engine can include definition of rules and/or logic for action recommendation. Rules or logic for determining a next best user action, based on resiliency scores, can be specified using the rule configuration engine 202. A next best action for a particular category can be determined based on a user's current completed and uncompleted actions in the category. In some cases, rule definition can include defining certain actions that can be completed by a user in a financial category to increase a financial resiliency score of a user. A given action may have an associated action threshold. For instance, example actions may be to create an account of a certain type, have a certain balance in a certain kind of account, etc. Actions may have an action priority which may be on a numerical scale (e.g., one to ten) or priority categories (e.g., important, some-what important, optional). Rules for determining resiliency scores in a category can be based on a user completing a certain number or percentage of actions defined for the category, whether or to what degree a user has reached an action threshold for one or more actions (e.g., does a certain type of account have a certain balance, or how close a user's account balance is to a certain account threshold, etc.), what percentage of highest priority actions a user has completed, etc. In some cases, rules can specify that completing different number of actions for a category, or different number of most important actions, etc., can result in resiliency scores being in certain predefined resiliency score buckets, such as financially-vulnerable, financially-coping, approaching-resilience, and financially-resilient.

The resiliency score calculator 204 can calculate resiliency scores based on rules configured by the rule configuration engine 202. The resiliency score calculator 204 can generate updated resiliency scores in response to determination by the event detector 212 of user-performed actions and/or updated customer account data. For example, the event detector 212 can monitor activity in a user account to detect when any changes are made or any actions are performed with respect to any of the financial categories. In response to detection of an event or user activity, the event detector 212 can trigger the resiliency score calculator to generate updated resiliency scores. The resiliency score generator 204 can then trigger the visualization generator 208 to generate a new updated visual that is dynamically presented to the user.

In general, the resiliency score calculator 204 can determine which actions of actions for a category have been completed by the user, and generate a resiliency score based in part on the user's completed account and/or account instances, account statuses, account values, etc. When the rules specify criteria for reaching a certain resiliency bucket (e.g., financially-vulnerable, financially-coping, approaching-resilience, and financially-resilient), the resiliency score calculator can determine an appropriate bucket for the user for each financial category. For instance, the user may be deemed as being in an approaching-resilience bucket for a savings category and in a financially-resilient bucket for a spending category. Other examples of resiliency score rules and resiliency score calculations are described below with respect to FIG. 2B.

The action recommender 206 can determine recommended actions for different financial categories based on resiliency scores for the categories and based on action rules configured in the rule configuration engine 202. For instance, the action recommender 206 can identify one or more most important (for increasing resiliency) currently uncompleted actions for the user. The action recommender 206 can generate, for example, selectable links that when selected can send a message to an appropriate system (e.g., a financial system) to perform the recommended action.

The visualization generator 208 can generate visualizations to display financial wellbeing in different categories based on the resiliency scores and to display recommended actions (with links, as appropriate). The visualization generator 208 can provide updated visualizations in response to user input or in response to updated resiliency scores or updated recommendations.

The connectivity engine 210 can be used to establish secure channels (e.g., using transport layer security (TLS), IP security (IPSec), HTTPS (HyperText Transport Protocol Secured) with disparate financial systems over a network. The connectivity engine 210 can receive, over secured channels, user financial data and indications of completed actions that have been completed in response to user action requests. The connectivity engine 210 can connect to user devices to provide visualizations and to receive indications of user input with the provided visualizations.

FIG. 2B is a table 220 that illustrates rule evaluation for categories and sub-categories. The table 220 includes information for different categories 222. For each category 222, the table 220 includes information for different sub-categories 224. For each subcategory 224, a data source 226 is specified and also rule evaluation information 228 that describes how financial resiliency can be calculated by the resiliency score calculator 204 with respect to the respective sub-category 224. Information in the table 220 can be incorporated into the rule configuration engine 202, for example.

For instance, for a savings account sub-category 230 of a savings category 231, the table 220 specifies that data can be retrieved for a user from an enterprise data warehouse (EDW) and that the resiliency score calculator 204 can determine if a savings account indicator in the retrieved information is set, when determining whether the user has a savings account. The EDW information can correspond to the customer account data 124 that has been retrieved from various financial systems 106, for example. As another example, for an auto deposit set-up sub category 232, the resiliency score calculator 204 can determine whether a pre authorized credit setting exists for a savings account, in EDW information. For a consistently-saving sub-category 234, the table 220 specifies that the resiliency score calculator 204 can evaluate EDW information to determine whether a total monthly savings amount (e.g., for one or more recent months) is at least fifteen percent of an income amount identified for the user. Similarly, for an emergency funds sub-category 236, the table 220 specifies that the resiliency score calculator 204 can determine, from EDW information, whether a total savings balance for the user is at least an amount corresponding to three months of a user's expenses.

For a spend-under-income sub-category 238 of a spending category 239, the table 220 specifies that the resiliency score calculator 204 can determine, from EDW information, whether an amount of deposits (in a particular time period) is greater than an amount of withdrawals in that time period. For a consistent spending sub-category 240, the table 220 specifies that the resiliency score calculator 204 can determine, from EDW information, whether a variation in spending data for the user in a particular time period is less than a certain percentage. For an auto-payments set-up subcategory 242, the table 220 specifies that the resiliency score calculator 204 can determine, from EDW information, whether a bill payment configuration has been set. For a no-waste spending subcategory 244, the table 220 specifies that the resiliency score calculator 204 can determine, from EDW information, whether the user has any (or more or less than a certain amount of) overdraft fees, late payments, and/or credit card interest payments.

For an explore-insurance-needs subcategory 246 of a planning category 247, the table 220 specifies that the resiliency score calculator 204 can evaluate planning information received from a financial advisor or a financial advisor system. The planning information may be included in EDW information after being received. The resiliency score calculator 204 can determine, for the explore-insurance-needs subcategory 246, whether information received from the user's financial advisor indicates that an insurance exploration task has been performed or completed. Similarly, the resiliency score calculator 204 can determine, for a has-investments subcategory 248, whether information received from the user's financial advisor indicates that investment selections have been made.

For a financial risk survey subcategory 250, the table 220 specifies that the resiliency score calculator 204 can evaluate whether information received from the user's financial advisor indicates that a risk assessment has been performed for the user. For a long-term savings sub-category 252, the table 220 specifies that the resiliency score calculator 204 can determine, from EDW information, whether the user has a TFSA (Tax Free Savings Account) or a RRSP (Registered Retirement Savings Account).

For a credit card account sub-category 254 and a line of credit subcategory 256 of a borrowing category 257, the table 220 specifies that the resiliency score calculator 204 can determine, from EDW information, whether the user has a credit card account or a line of credit account, respectively. For a low-credit utilization subcategory 258, the table 220 specifies that the resiliency score calculator 204 can determine, from EDW information and information received from a credit bureau, whether a credit utilization percentage for the user is greater than one percent and less than thirty percent. Similarly, for a manageable debt subcategory 260, the table 220 specifies that the resiliency score calculator 204 can determine, from EDW information and information received from a credit bureau, whether the user's debt service amount is less than a certain percent. Other subcategories can be used by the resiliency score calculator 204, as discussed below.

Different approaches can be used by the resiliency score calculator 204 to calculate resiliency scores per category and, in some cases, an overall resiliency score (which may be presented in the dynamic application for the user). In some implementations, the resiliency score calculator 204 determines a resiliency score per category by calculating a ratio of a number of completed actions in a category divided by a total number of recommended actions for the category. Similarly, the resiliency score calculator 204 can determine an overall resiliency score by calculating a ratio of a number of completed actions in all categories divided by a total number of recommended actions for all categories. In some cases, predetermined buckets may be used by the resiliency score calculator 204 to place a user in a particular bucket for a category or an overall level of resiliency. For instance, resiliency scores between 0% and 39%, 40% and 59%, 60% and 79%, and 80%-100% may be considered (and labeled) as financially-vulnerable, financially-coping, approaching-resilience, and financially-resilient, respectively.

In some implementations, more complex scoring can be used by the resiliency score calculator 204 for overall resiliency scores, category scores, and/or scores related to particular sub-categories. For instance, a subcategory may be "has regular income". To calculate a resiliency score for the "has regular income" subcategory, the resiliency score calculator 204 can calculate a sum of income of different types (e.g., payroll, private pensions, government assistance, interest income) for multiple months over a time period. The resiliency score calculator 204 can then calculate a monthly income variation score by determining a coefficient of variation (CoV) value based on a standard deviation of the monthly income values and a mean of the monthly income values. The resiliency score calculator 204 can then calculate a resiliency score for the "has regular income" subcategory based on the determined CoV value. For instance, CoV values in ranges of [0%-10%), [10%-25%), [25%-50%), [50%-75%), [75%-90%), and [90%-100%] can result in resiliency scores for the "has regular income" subcategory of 100, 80, 60, 40, 20, and 0, respectively. The resiliency score calculator 204 can aggregate (e.g., using an arithmetic mean) a subcategory resiliency score with other subcategory resiliency scores of a category to determine a resiliency score for the category.

As another example, for the spend-under-income subcategory 238, the resiliency score calculator 204 can first determine an annual spend amount by summing withdrawals from spending accounts in various predetermined categories (e.g., mortgage, rent, insurance, fees and service charges, interest charges, credit card payments, bills, other purchases). The resiliency score calculator 204 can determine a monthly spend value by dividing the annual spend amount by twelve. The resiliency score calculator 204 can determine a spend-to-income ratio by dividing the monthly spend value by a previously-determined monthly income value. The resiliency score calculator 204 can then calculate a resiliency score for the spend-under-income sub-category 238 based on the determined spend-to-income ratio. For instance, spend-to-income ratios in ranges of [0%-50%),

[50%-80%), [80%-100%], and greater than 100% can result in resiliency scores for the spend-under-income sub-category 238 of 100, 75, 50, and 0, respectively.

For an example "pays-bills-on-time" subcategory, the resiliency score calculator 204 can determine a non-sufficient-funds (NSF) to pre-authorized debit (PAD) ratio by, dividing, for example, a count of occurrences of NSF fees for a user in the last 12 months by a total count of PADs in the last twelve months. The resiliency score calculator 204 can then calculate a resiliency score for the "pays-bills-on-time" subcategory based on the determined NSF to PAD ratio. For instance, NSF to PAD ratios in ranges of [0%-5%), [5%-10%), [10%-15%), [15%-20%), [20%-25%], and greater than 25% can result in resiliency scores for the "pays-bills-on-time" subcategory of 100, 80, 60, 40, 20, and 0, respectively. As another example, the resiliency score calculator 204 can evaluate payment date (e.g., day of month of payment) variation for different user accounts to determine (and/or adjust) a resiliency score for the "pays-bills-on-time" subcategory. For instance, the resiliency score calculator 204 can assign higher resiliency scores for the "pays-bills-on-time" subcategory when payment date variations are lower and lower resiliency scores for the "pays-bills-on-time" subcategory when payment date variations are higher.

For an example "has sufficient liquid income" subcategory, the resiliency score calculator 204 can determine a liquid savings amount for a user by subtracting spend, debt, and investment amounts from a determined income amount. The resiliency score calculator 204 can determine a months-with-sufficient-funds value by dividing the liquid savings amount by a monthly spend amount. The resiliency score calculator 204 can then calculate a resiliency score for the "has sufficient liquid income" subcategory based on the determined months-with-sufficient-funds value. For instance, months-with-sufficient-funds values in ranges of [0 months-1 month), [1 month-3 months), [3 months-6 months], and greater than 6 months can result in resiliency scores for the "has sufficient liquid income" subcategory of 25, 50, 75, and 100, respectively. As another example, the resiliency score calculator 204 can determine and/or adjust resiliency scores for the "has sufficient liquid income" subcategory based on whether checking account balances for the user are increasing or decreasing over time (e.g., with a trend of increasing account balances resulting in higher resiliency scores for the "has sufficient liquid income" subcategory and a trend of decreasing account balances resulting in lower resiliency scores for the "has sufficient liquid income" subcategory.

For an example "has sufficient long-term income" subcategory, the resiliency score calculator 204 can calculate a total investment value for the user (e.g., based on investment account information for the user). The resiliency score calculator 204 can calculate an investment-to-income ratio by dividing the total investment value by a total income value for the user. The resiliency score calculator 204 can then calculate a resiliency score for the "has sufficient long-term income" subcategory based on the determined investment-to-income ratio. For instance, investment-to-income ratios in ranges [0-10%), [10%-15%), [15%-25%], and greater than 25% can result in resiliency scores for the "has sufficient long-term income" subcategory of 25, 50, 75, and 100, respectively.

For the manageable debt subcategory 260, the resiliency score calculator 204 can determine, from user account information, a total debt value. The resiliency score calculator 204 can determine a debt-to-income ratio by dividing the total debt value by a total income value. The resiliency score calculator 204 can then calculate a resiliency score for the manageable debt subcategory 260 based on the determined debt-to-income ratio. For instance, debt-to-income ratios in ranges [0-1.5%), [1.5%-5%), [5%-10%), [10%-20%), [20-35%], and greater than 35% can result in resiliency scores for the "has sufficient long-term income" subcategory of 100, 80, 60, 40, 20, and 0, respectively.

FIG. 3 is a diagram 300 that illustrates the displaying of an example user interface 302 of an example application on a user device 304. The user device 304 is associated with a user 305. The user interface 302 includes a visual 306 that is used to represent different categories of financial well-being along with a diamond shape 307 that indicates a degree of well-being with respect to each category. For instance, the visual 306 includes category symbols 308, 310, 312, and 314 for savings, spending, planning, and borrowing categories, respectively, with each symbol having a corresponding category label.

The visual 306 has a radar-like appearance, for example, with the diamond shape 307 appearing on top of concentric circles 316. In the visual 306, the closer that a diamond vertex approaches a respective category symbol 308, 310, 312, or 314 (e.g., the closer the diamond approaches an outermost circle of the concentric circles 316), a higher a likelihood that a financial well-being for the user 305 in a corresponding category is at par or appropriate for the user 305. In some cases, the different circles in the concentric circles 316 correspond to different levels of financial resiliency. For example, levels of financial resiliency from more resilient to less resilient can include financially resilient, approaching financial resilience, financially coping, and financially vulnerable, with the higher resiliency levels corresponding to outer circles and the lesser resiliency levels corresponding to inner circles.

For example, in the visual 306, a distance between a vertex 318 and the spending category symbol 310 is smaller than a distance between a vertex 320 and the borrowing category symbol 314. In other words, as compared to the vertex 318, the vertex 320 is relatively closer to the center of the concentric circles 316. These relative placements of the vertices 318 and 320 indicate that the user 305 has greater financial well-being in terms of spending than borrowing. As another example, a distance between a vertex 322 and the savings category symbol 308 is smaller than a distance between a vertex 324 and the plan category symbol 312. The relative placements of the vertices 322 and 324 indicate that the user 305 has greater financial well-being in terms of savings than planning. Accordingly, the user interface 302 is beneficial because it allows, in a single presentation, visualization of the user's financial well-being across different categories.

In some implementations, the visual 306 can be dynamically adjusted in real-time. For example, if the user 305 makes adjustments or takes actions with respect to one or more categories or sub-categories within a category, underlying processing logic associated with the visual 306 can be configured to detect those changes/additions, and thereafter compute updated data and corresponding updates to the visual. Recommended actions can be presented in response to user interaction with the visual 306, as described in more detail below with respect to FIGS. 4-7.

FIG. 4 is a diagram 400 that illustrates a progression of example interactive user interfaces 402 and 404 of an example application. The interactive user interfaces 402 and 404 are displayed on an example user device 406 of a user 408. The interactive user interface 402 corresponds to the user interface 302 described above with respect to FIG. 3. For example, the interactive user interface 402 includes a visual 410 that displays relative financial well-being with respect to various categories, including, among other categories, a savings category represented by a savings category symbol 412.

Category symbols can be user interactive. For instance, the user 408 can interact (e.g., via touch on a touch-sensitive surface of the user device 406) with a particular category symbol such as the savings category symbol 412. In response to user interaction with the savings category symbol 412, generation and presentation of the interactive user interface 404 can be triggered. The interactive user interface 404 can display more detailed data (e.g., as compared to the interactive user interface 402) about the financial well-being of the user 408 with respect to the savings category.

As shown in the interactive user interface 404, in some implementations, the more-detailed information about a respective category can be presented to the user 408 in the form of a checklist 414. The checklist 414 includes, for example, a savings account item 416, a set up auto deposit item 418, a has-investment item 420, and an emergency funds item 422. The items in the checklist 414 can represent sub-categories under (e.g., attributes of) the savings category and can be displayed in the checklist with either a highlighted or a non-highlighted check mark that indicates whether the user's financial well-being in a respective sub-category meets certain thresholds.

For example, the highlighted check marks in the savings account item 416, the set up auto deposit item 418, and the has-investment item 420 indicate that the user 408 has a savings account, has an auto-deposit set up to automatically deposit money (e.g., into the savings account), and has investments. A non-highlighted check mark in the emergency funds item 422 indicates that the user 408 does not have an adequately funded emergency fund, for example. As described in more detail below with respect to FIG. 5, the items in the checklist 414 can be interactive, and further details about a respective subcategory can be presented in yet another user interface in response to user selection of one of the items in the checklist 414.

Figure 5:
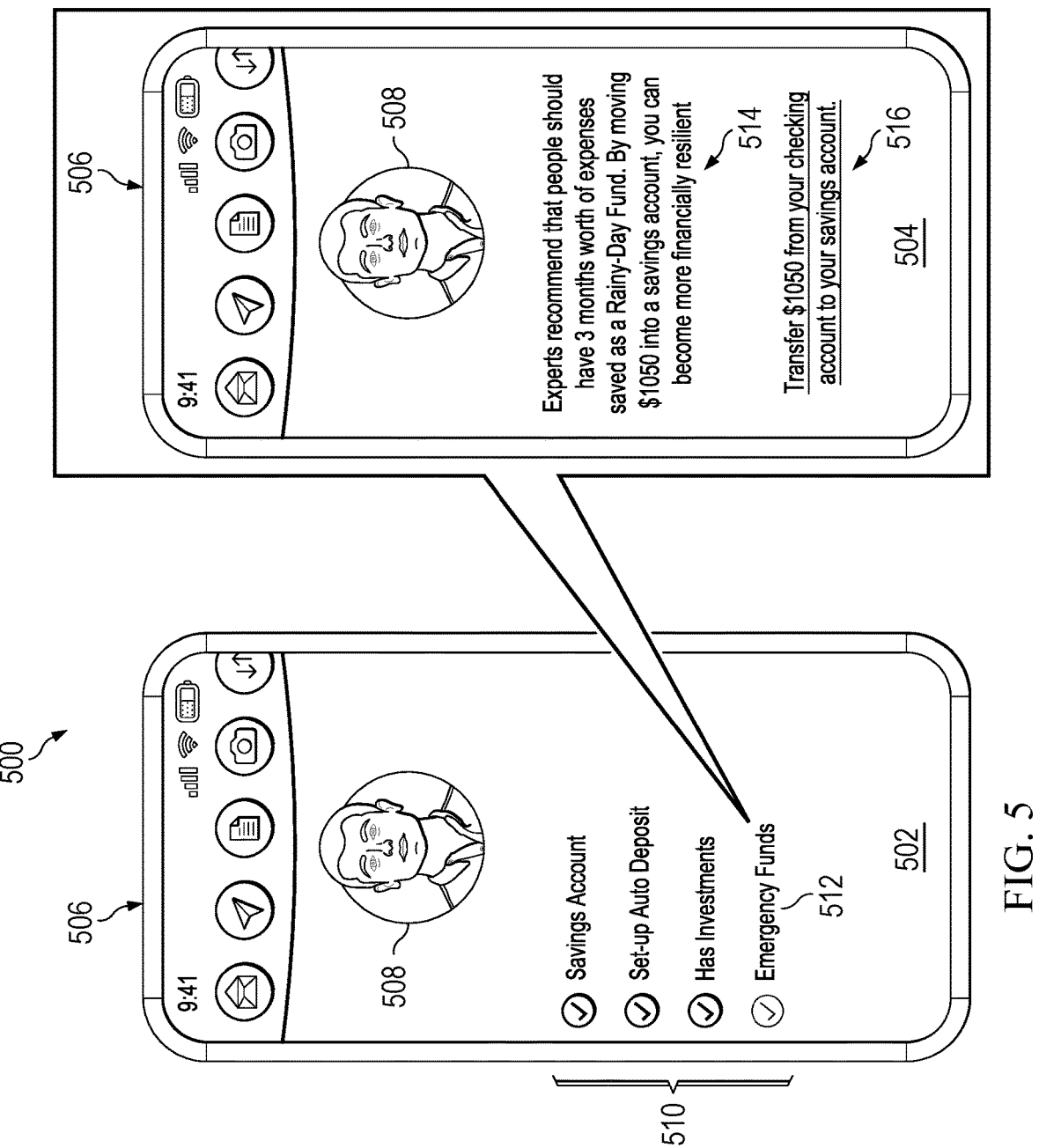

FIG. 5 is a diagram 500 that illustrates a progression of example interactive user interfaces 502 and 504 of an example application. The interactive user interfaces 502 and 504 are displayed on an example user device 506 of a user 508. The interactive user interface 502 corresponds to the interactive user interface 402 described above with respect to FIG. 4. For example, the interactive user interface 502 includes a checklist 510 that displays subcategories of a savings category. The checklist 510 includes, among other items, an emergency funds item 512 for an emergency fund savings subcategory, that has a corresponding non-highlighted check mark that indicates that the user 508 does not have an adequately-funded emergency fund.

Items in the checklist 510 can be user interactive. For example, the user 508 can select the emergency fund item 512 to view further information about the emergency fund savings subcategory. For instance, in response to user selection of the emergency fund item 512, generation and presentation of the interactive user interface 504 can be triggered. The interactive user interface 504 includes a recommendation 514 regarding ways in which the user 508 can meet financial well-being in the emergency fund savings subcategory. The recommendation 514 is for the user 508 to take a particular action, such as moving a certain amount of money into a savings account (e.g., to create a "rainy-day" fund). In other examples, presented recommendations can be for financial products and/or services that could be offered to the customer to become financially resilient in a particular subcategory. For example, if an investments subcategory reflects a lack of financial well-being (e.g., if the customer has no investments), the system can be configured to identify financial products/services that can facilitate creation and management of an investment portfolio for the customer.

For some recommendations, the interactive user interface 504 can include interactive controls that enable a user to take action (e.g., in response the system's provided recommendations) and in doing so, allow exercising control over the underlying systems to which the application is connected. For example, relative to the recommendation 514 to move certain money into a savings account to create a rainy-day fund, the interactive user interface 504 can include a selectable link 516 to initiate such a transfer. The transfer can be triggered in response to user selection of the selectable link 516, and the transfer can include secure communications, over an existing secure communications channel, to an underlying connected system (e.g., a financial account at a particular financial institution) of an amount of transfer, a source of transfer funds, and a location of the transfer funds. Accordingly, the user interface 504 (and other application user interfaces described herein) can serve, from a user's perspective, as a single connected portal that is integrated with various accounts for which secure connections already exist. Accordingly, the user can perform and initiate various types of transactions from a single application. A single portal approach can not only reduce user interactions but can save resources that would be required for launching different applications, establishing of separate secure channels by each separate application, etc.

As another example, if the system generates a recommendation to open a new savings account, the interactive user interface 504 can include recommendation(s) for different types of savings accounts and selectable option(s) for triggering creation and opening of an account of a respective recommended account type. User selection of a selectable option for a recommended account type can trigger secure communications, over an existing secure communication channel(s), to appropriate system(s) to enact opening of the account. The recommendation to open a new account can be for an account at a same organization as the organization that develops and provides the dynamic user interface/application. Accordingly, information for a current user session (e.g., user identifier, user authorization information), can be sent over the existing secure communication channel and used for account creation, thus saving resources as compared to other solutions that would require the user to launch a different application and resupply user information or credentials, establishment of new or different communications channels, etc.).

In general, the interactive user interface 504 can be designed to have built-in controls that leverage established links (and/or application programming interfaces (APIs)) to facilitate taking action on provided recommendations, without requiring the user to navigate away from the application. In this manner, the techniques described herein provide a seamless interaction with disparate systems, which in turn facilitates seamless transaction performance and efficiency by enabling the user 508 to take steps to become financially resilient without having to separately navigate to and interact with multiple different systems.

As mentioned above with respect to FIG. 3, in response to the system determining that the user 508 has acted on a presented recommendation, the interactive user interface 502 (and/or the interactive user interface 504) can be dynamically updated to reflect an improved financial well-being that has been improved as a result of the user action. As an example, the system can determine that the user has selected the selectable link 516 and that a corresponding transfer has been initiated and completed. The interactive user interface 504 can be automatically updated to include a note regarding confirmation of the transfer and to include a control that enables a re-displaying of the interactive user interface 502 (e.g., to enable the user 508 to return to the interactive user interface 502). The interactive user interface 502 can be updated to reflect completion of the transfer. For instance, the emergency fund item 512 can include a highlighted check mark rather than a non-highlighted checkmark, to reflect that the transfer has essentially established an emergency fund for the user 508. Additionally, other user interfaces may be updated to reflect a change in well-being for a category or subcategory for which an action has been performed. For instance, with reference to the previously-discussed FIG. 3, the diamond shape 307 may be adjusted, such as by a movement of the vertex 322 closer to the savings category symbol 308, to reflect an improvement in financial well-being of the user 305 with respect to the savings category.

Similar interactive user interfaces and similar progressions between user interfaces as described above with respect to FIGS. 3-5 can be provided for other categories. For example, FIGS. 6-8 below illustrate additional examples of various interfaces that can be generated for different categories.

Figure 6:
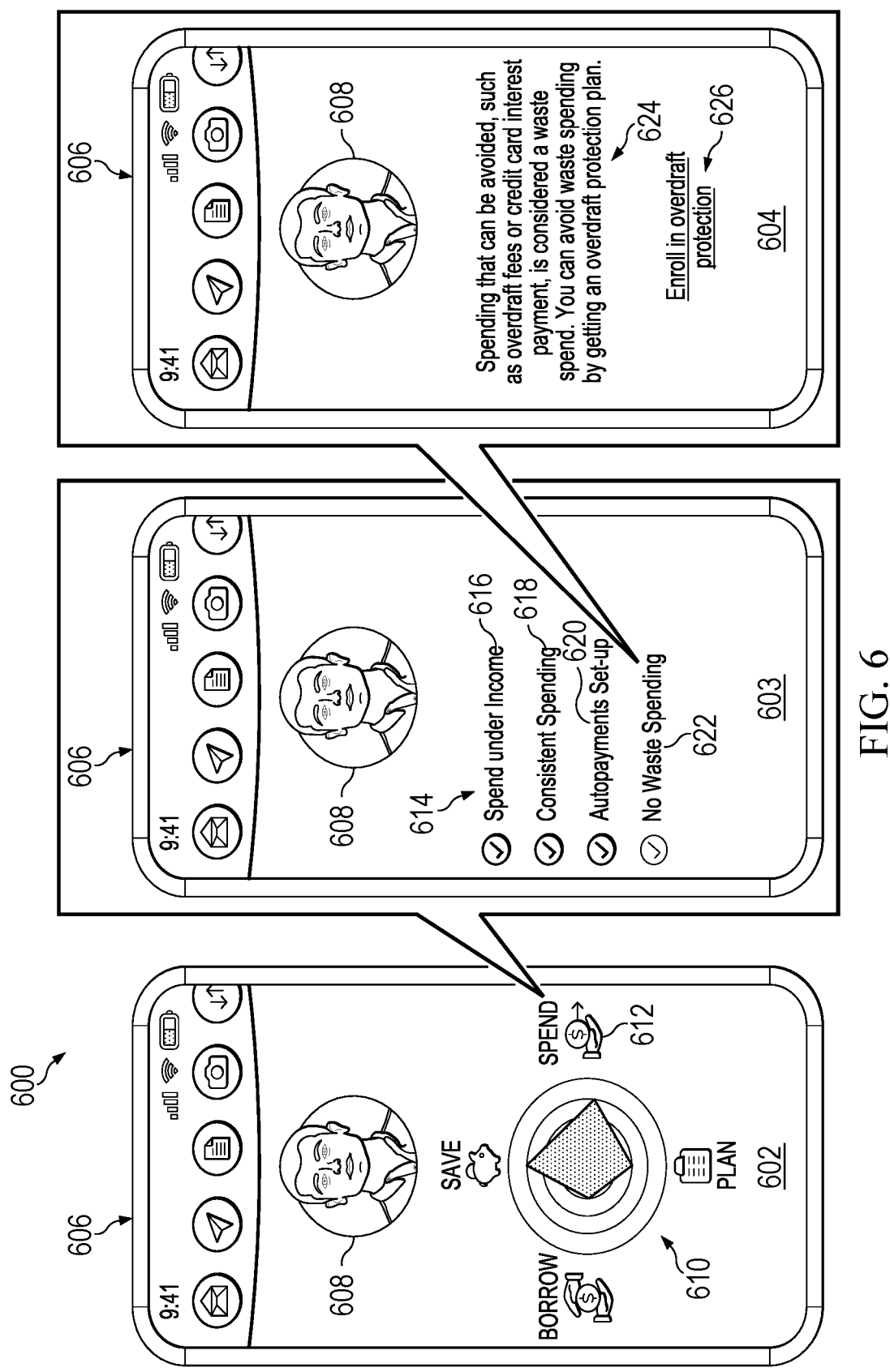

FIG. 6 is a diagram 600 that illustrates a progression of example interactive user interfaces 602, 603, and 604 of an example application. The interactive user interfaces 602, 603, and 604 are displayed on an example user device 606 of a user 608. The interactive user interface 602 corresponds to the user interface 302 described above with respect to FIG. 3. For example, the interactive user interface 602 includes a visual 610 that displays relative financial well-being with respect to various categories, including, among other categories, a spending category represented by a spending category symbol 612.

In response to user interaction with the spending category symbol 612, generation and presentation of the interactive user interface 603 can be triggered. The interactive user interface 603 is similar to the interactive user interface 404 described above with respect to FIG. 4. For example, the interactive user interface 603 can display more detailed data (e.g., as compared to the interactive user interface 602) about the financial well-being of the user 608 with respect to the spending category, such as in a checklist 614.

The checklist 614 includes a spend-under-income item 616, a consistent spending item 618, an auto payments set-up item 620, and a no-waste-spending item 622. The items in the checklist 614 can represent sub-categories under the spending category and can be displayed in the checklist with either a highlighted or a non-highlighted check mark that indicates whether the user's financial well-being in a respective spending sub-category meets certain thresholds. For example, the spend-under-income item 616, the consistent spending item 618, and the auto payments set-up item 620 are each displayed with a highlighted check mark that indicates that the user 608 has spent under his income, has consistent spending, and has set up auto payments, respectively. In contrast, the no-waste-spending item 622 is shown with a non-highlighted checkmark that indicates that the user 608 may have some waste spending.

Items in the checklist 614 can be user interactive. For example, the user 608 can select the no-waste-spending item 622 to view further information about a no-waste-spending subcategory. For instance, in response to user selection of the no-waste-spending item 622, generation and presentation of the interactive user interface 604 can be triggered. The interactive user interface 604 includes a recommendation 624 regarding ways in which the user 608 can meet financial well-being in the no-waste-spending subcategory. For instance, the recommendation 624 advises the user 608 about example forms of waste spending and recommends an overdraft protection plan. The interactive user interface 604 also includes a link 626 to enable the user 608 to enroll in a recommended overdraft protection plan. Selection of the link 626 can trigger secure communication with a financial system and initiation of further steps (which may include presentation of and interaction with additional user interfaces) for enrolling in the overdraft protection plan.

Figure 7:
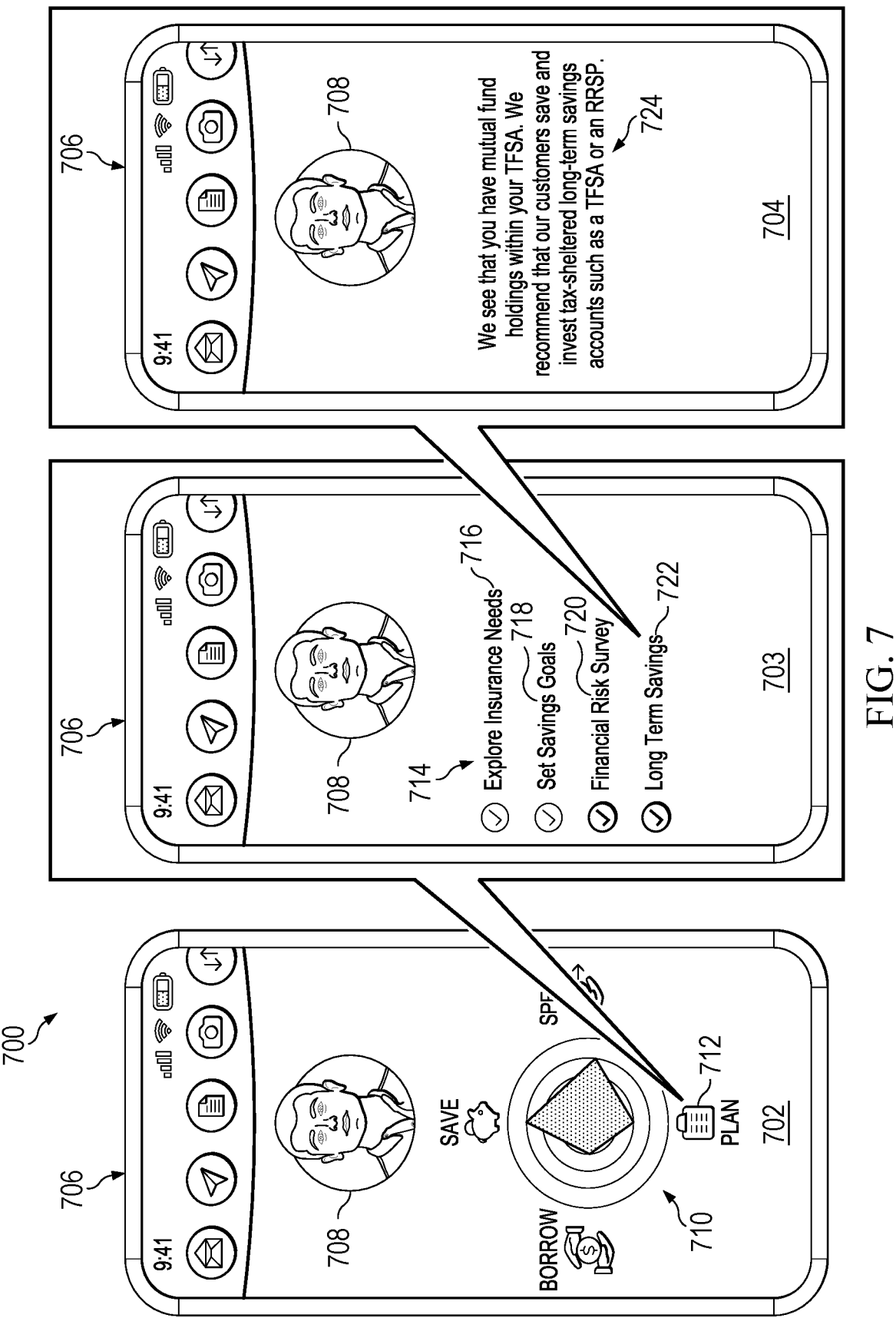

FIG. 7 is a diagram 700 that illustrates a progression of example interactive user interfaces 702, 703, and 704 of an example application. The interactive user interfaces 702, 703, and 704, which are similar to the interactive user interfaces 602, 603, and 604 described above with respect to FIG. 6, are displayed on an example user device 706 of a user 708. The interactive user interface 702 corresponds to the user interface 302 described above with respect to FIG. 3. For example, the interactive user interface 702 includes a visual 710 that displays relative financial well-being with respect to various categories, including, among other categories, a planning category represented by a planning category symbol 712.

In response to user interaction with the planning category symbol 712, generation and presentation of the interactive user interface 703 can be triggered. The interactive user interface 703 is similar to the interactive user interface 404 described above with respect to FIG. 4 and to the interactive user interface 603 described above with respect to FIG. 6. For example, the interactive user interface 703 can display more detailed data (e.g., as compared to the interactive user interface 702) about the financial well-being of the user 708 with respect to the planning category, such as in a checklist 714.

The checklist 714 includes an explore-insurance-needs item 716, a set-savings-goals item 718, a financial-risk-survey item 720, and a long-term-savings item 722. The items in the checklist 714 can represent sub-categories under the planning category and can be displayed in the checklist with either a highlighted or a non-highlighted check mark that indicates whether the user's financial well-being in a respective planning sub-category meets certain thresholds. For example, the financial-risk-survey item 720 and the long-term-savings item 722 are each displayed with a highlighted check mark that indicates that the user 708 has completed a financial risk survey and has sufficient long-term savings, respectively. In contrast, the explore-insurance-needs item 716 and the set-savings-goals item 718 are each shown with a non-highlighted checkmark that indicates that the user 708 has not been presented with information about available insurance products and has not set savings goals in the system, respectively.

Items in the checklist 714 can be user interactive. In some implementations, highlighted and well as non-highlighted items may be selectable. For example, the user 708 can select the long-term-savings item 722 to view further information about a long-term-savings subcategory including, in some cases, information that indicates how the user 708 has met well-being threshold(s) for the subcategory. For instance, in response to user selection of the long-term-savings item 722, generation and presentation of the interactive user interface 704 can be triggered. The interactive user interface 704 includes information 724 regarding ways in which the user 708 has met threshold(s) for the long-term-savings subcategory (as well as other general information about the subcategory). For instance, the information 724 indicates that the user 708 already has mutual fund holdings in a tax-free savings account (TFSA). In some cases, the interactive user interface 704 can include both information about how the user 708 has met certain threshold(s) for the subcategory as well as recommendations for how the user 708 can further increase financial well-being in the subcategory (or otherwise maintain a current level of well-being).

Figure 8:
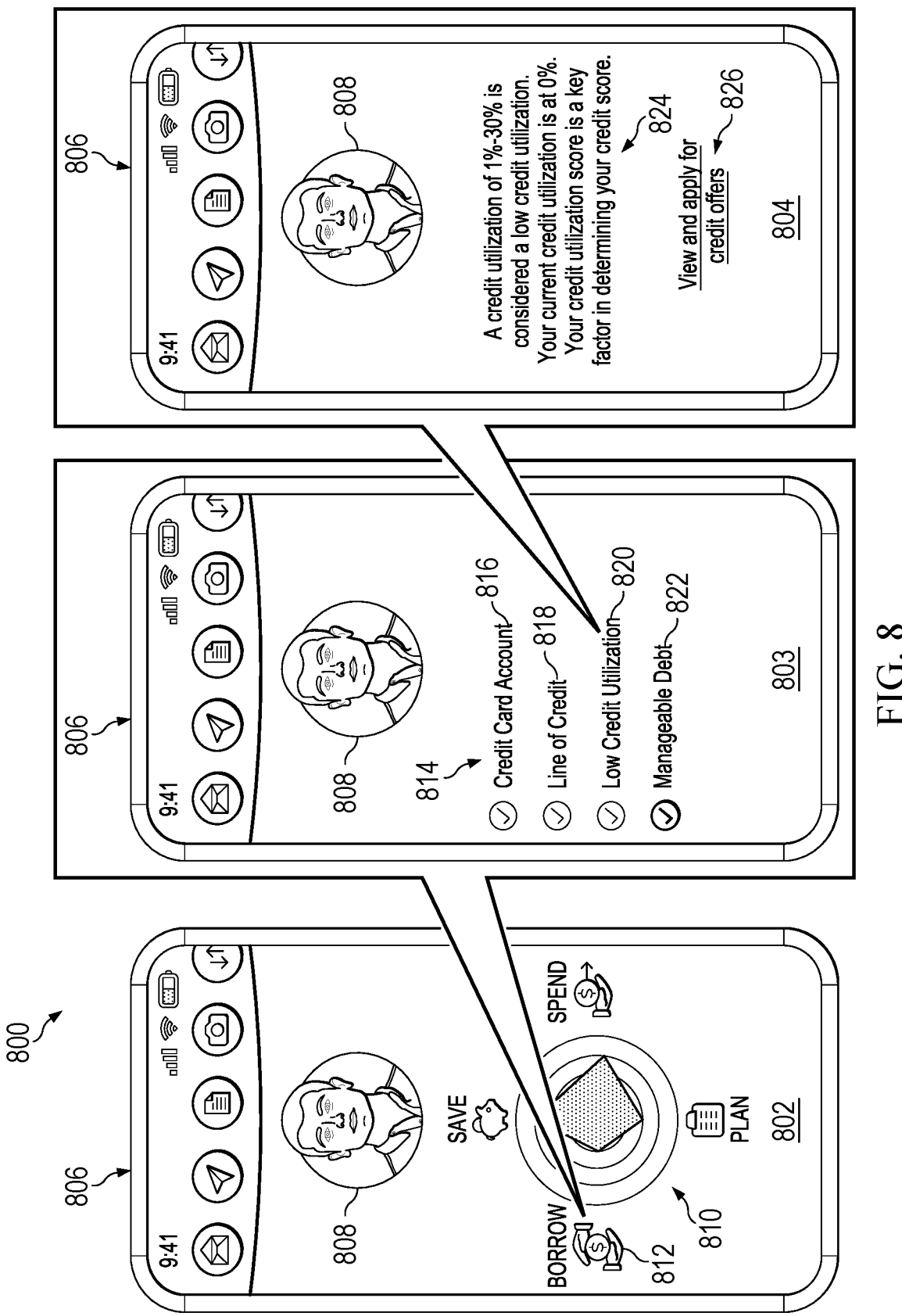

FIG. 8 is a diagram 800 that illustrates a progression of example interactive user interfaces 802, 803, and 804 of an example application. The interactive user interfaces 802, 803, and 804, which are similar to other interactive user interfaces described above with respect to FIGS. 3-7, are displayed on an example user device 806 of a user 808. The interactive user interface 802 corresponds to the user interface 302 described above with respect to FIG. 3. For example, the interactive user interface 802 includes a visual 810 that displays relative financial well-being with respect to various categories, including, among other categories, a borrowing category represented by a borrowing category symbol 812.

In response to user interaction with the borrowing category symbol 812, generation and presentation of the interactive user interface 803 can be triggered. The interactive user interface 803 is similar to the interactive user interface 404 described above with respect to FIG. 4, the interactive user interface 603 described above with respect to FIG. 6, and the interactive user interface 703 described above with respect to FIG. 7. For example, the interactive user interface 803 can display more detailed data (e.g., as compared to the interactive user interface 802) about the financial well-being of the user 808 with respect to the borrowing category, such as in a checklist 814.

The checklist 814 includes a credit-card-account item 816, a line-of-credit item 818, a low-credit-utilization item 820, and a manageable-debt item 822. The items in the checklist 814 can represent sub-categories under the borrowing category and can be displayed in the checklist with either a highlighted or a non-highlighted check mark that indicates whether the user's financial well-being in a respective borrowing sub-category meets certain thresholds. For example, the manageable-debt item 822 is displayed with a highlighted check mark that indicates that the user 808 has a manageable level of debt. In contrast, the credit-card-account item 816, the line-of-credit item 818, and the low-credit-utilization item 820 are each shown with a non-highlighted checkmark that indicates that the user 808 does not have a credit card account, does not have a line of credit, and is outside of threshold(s) for satisfying a low credit utilization metric, respectively.

Items in the checklist 814 can be user interactive. For example, the user 808 can select the low-credit-utilization item 820 to view further information about a credit utilization subcategory. For instance, in response to user selection of the low-credit-utilization item 820, generation and presentation of the interactive user interface 804 can be triggered. The interactive user interface 804 includes information 824 that describes credit utilization and metrics that describe how the credit utilization of the user 808 is currently outside of a range required to meet low credit utilization standards. Currently, the user 808 has a 0% credit utilization rate which may be caused at least in part due to the user not having credit accounts or products. Accordingly, the interactive user interface 804 includes a link 826 that enables the user to view (and apply for) credit card offers. Selection of the link 826 can trigger secure communication with a financial system and initiation of further steps (which may include presentation of and interaction with additional user interfaces) for viewing and applying for credit card offers.

FIG. 9 is a flow diagram of an example method 900 for generating and providing a visualization for presenting resiliency information. It should be understood that method 900 can be performed, for example, by any suitable system, environment, software, and hardware, or a combination of systems, environments, software, and hardware as appropriate. In some instances, method 900 can be performed by a system including one or more components of the environment 100, including, among others, the financial resiliency system 108 or the financial resiliency system 200 or portions thereof, described in FIG. 1 and FIG. 2, respectively, as well as other components or functionality described in other portions of this description. Any suitable system(s), architecture(s), or application(s) can be used to perform the illustrated operations.

At 902, as described with reference to FIGS. 1-8, secure communication channels are established with a plurality of systems where data for a user is stored. For example, with reference to FIG. 1, the financial resiliency system 108 can establish a secure communication channel with one or more of the financial systems 106. As another example, with reference to FIG. 2, the connectivity engine 210 can establish a secure communication channel with one or more financial systems. As yet another example, secure communication channels can be established with one or more credit agencies or third-party systems that include user data that might inform financial well-being of the user.

At 904, as described with reference to FIGS. 1-8, user data for one or more categories in a plurality of categories is received, via the established secure communication channels, from the plurality of systems. For example, with reference to FIG. 1, the financial resiliency system 108 can receive the financial data 112*b* from the financial system 106*a*. The categories can be financial categories and financial categories can include spending, savings, borrowing, and planning, among other categories.

At 906, as described with reference to FIGS. 1-8, processing is performed for the user for each category of the plurality of categories. For example, at 908, as described with reference to FIGS. 1-8, a set of rules is applied to the received user data for the category to generate a resiliency score for the category for the user. For example, with reference to FIG. 1, the financial resiliency system 108 can determine the resiliency scores 128. As another example and with reference to FIG. 2, the resiliency score calculator 204 can determine resiliency scores for a user.

At 910, as described with reference to FIGS. 1-8, a set of recommended actions for the user to achieve a threshold resiliency score is generated, based at least on a comparison of the resiliency score to a threshold resiliency score. For example, and with reference to FIG. 1, the financial resiliency system 108 can determine the recommended actions 130. As another example and with reference to FIG. 2, the action recommender can determine one or more recommended actions based on resiliency scores determined by the resiliency score calculator 204.

Although rule-based systems are described, in some cases, machine learning systems can be used alternatively or in addition to rule-based systems. For instance, one or more machine learning models can be trained to determine or predict resiliency in different financial categories for a user. Recommended actions can be determined based on current resiliency scores determined by the machine-learning model (s). Additionally or alternatively, when the machine-learning models are trained to predict future resiliency scores of a user (e.g., based on a current resiliency score and on retrieved user data in different categories), recommended actions can be determined based on the predicted resiliency scores.

At 912, as described with reference to FIGS. 1-8, a dynamic user interface is provided for display on a client device associated with the user. The dynamic user interface uses the resiliency scores and the sets of recommended actions to display an interactive resiliency visual with which the user can interact. For example, and with respect to FIG. 1, the financial resiliency system 108 can generate the user interface information 134 and provide the user interface information 134 to the client device 102. The client device 102 can display the dynamic user interface based on received user interface information 134*a*. As another example and with reference to FIG. 2, the visualization generator 208 can generate a dynamic user interface, to be presented on a client device.

In some implementations, the dynamic user interface includes a series of user interfaces. For instance, a first user interface can include a graphical visualization of a holistic financial well-being of the user in the plurality of financial categories, a second user interface can include information corresponding to subcategories for a particular category, and a third user interface can include information including the set of recommendations for achieving financial well-being in the particular category. In some cases, the second user interface can be activated and presented upon a received user selection of a particular category in the graphical visualization including the plurality of financial categories and the third user interface can be activated and presented upon a received user selection of a particular subcategory from among the subcategories for the particular category. In some implementations, the first user interface includes a plurality of category symbols displaced around a shape with multiple vertices, where the closer a respective vertex is to a respective category symbol, the higher the financial well-being of the user in a respective category corresponding to the category symbol.

A selection of a selected recommended action can be received from the dynamic user interface. In response to receiving the selection of the selected recommended action, a request to perform a financial system action corresponding to the selected recommended action can be submitted from the client device to a particular financial system, over a pre-existing secure communication channel. A confirmation that the financial system action has been completed can be received from the particular financial institution. In response to receiving the confirmation that the financial system action has been completed, updated financial resiliency scores and updated sets of recommended actions for respective financial categories can be determined. The dynamic user interface can be updated based on the updated financial resiliency scores and updated sets of recommended actions.

Figure 10:
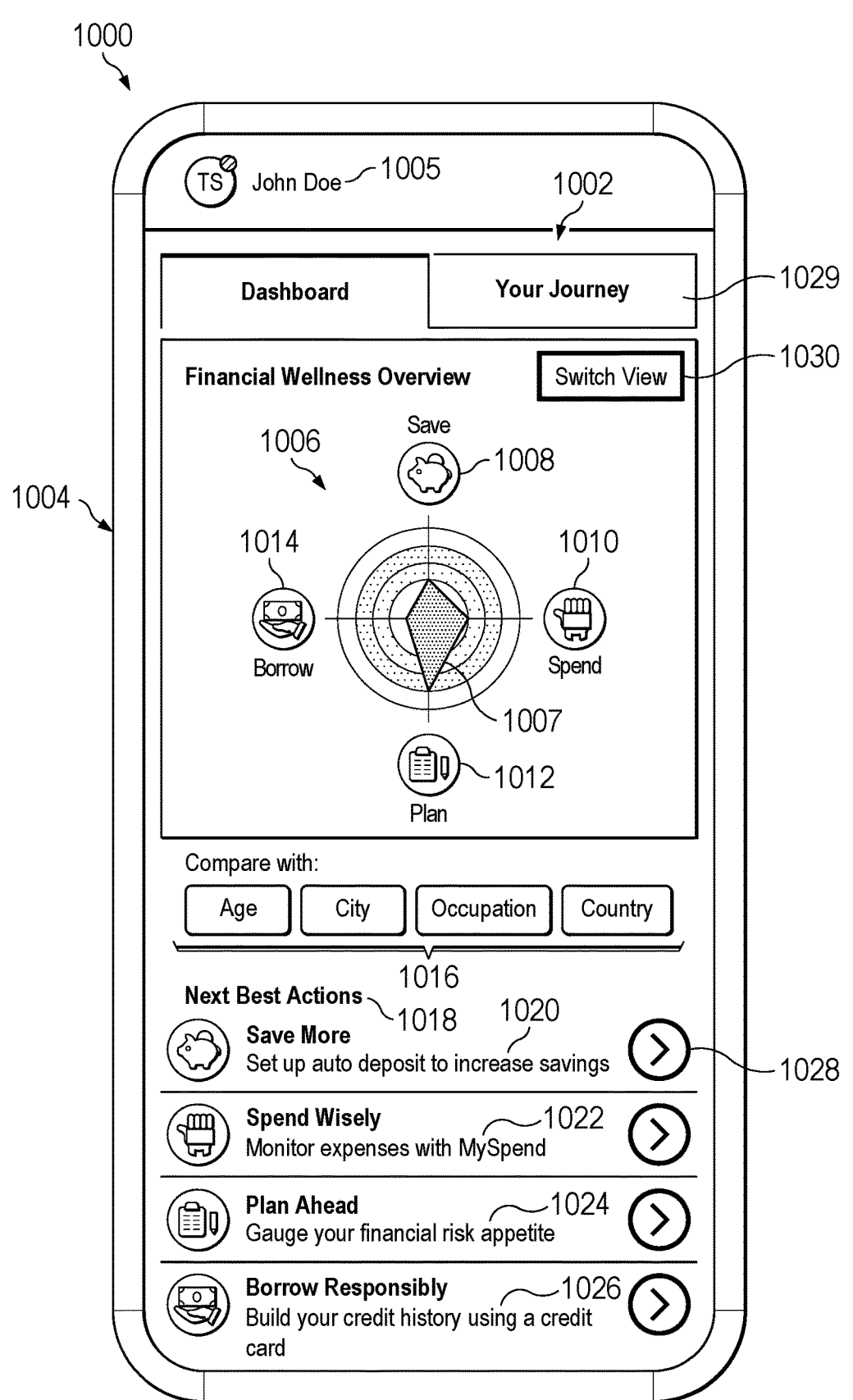
FIGS. 10-13 are diagrams that illustrate the displaying of an example user interface of an example application.

FIG. 10 is a diagram 1000 that illustrates the displaying of an example user interface 1002 of an example application on a user device 1004. The user device 1004 is associated with a user 1005. The user interface 1002 is similar to the user interface 302 described above with respect to FIG. 3. For example, the user interface 1002 includes a visual 1006 that represents, using a radar-like diamond shape 1007, different categories of financial well-being for savings, spending, planning, and borrowing categories represented by category symbols 1008, 1010, 1012, and 1014, respectively.

A section 1016 enables the user 1005 to select an age, city, occupation, or country option to compare their financial well-being with other users according to age, location, or occupation, for example. For instance, in response to selection of a given comparison option, a graphic can be displayed (e.g., in conjunction with the visual 1006 or as a separate graphic) that compares the financial well-being of the user 1005 with an average financial well-being of other users with respect to age, location, or occupation.

As mentioned above, the action recommender 206 can, based on current financial resiliency and current completed actions for the user 1006 in different categories, identify a next best action for the user 1006 in the different categories. The user interface 1002 includes a section 1018 that presents, per category, a determined next best action for the category. For instance, the section 1018 includes: 1) a recommended action 1020, for a savings category, of setting up auto deposit (e.g., for increasing savings); 2) a recommended action 1022, for a spending category, of monitoring expenses using a recommended application (e.g., a "MySpend" application); 3) a recommended action 1024, for a planning category, of participating in an assessment to gauge financial risk; and 4) a recommended action 1026, for a borrowing category, of building credit history by using a credit card. Each recommended action 1020, 1022, 1024, and 1026 can be presented with a selectable user interface control (e.g., a control 1028) that, when selected, can trigger processing related to carrying out the respective action. A tab 1029 can be selected to cause presentation of information regarding completed actions of the user 1005 with respect to the different categories, for example. The user interface 1002 includes a switch-view button 1030 that, when selected, causes replacement of the user interface 1002 in the application with a different user interface such one of the interfaces described below with respect to FIGS. 11-13. Selection of the switch-view button 1030 (and corresponding buttons on other interfaces) can result in a cycling of different user interfaces for the application, for example.

Figure 11:
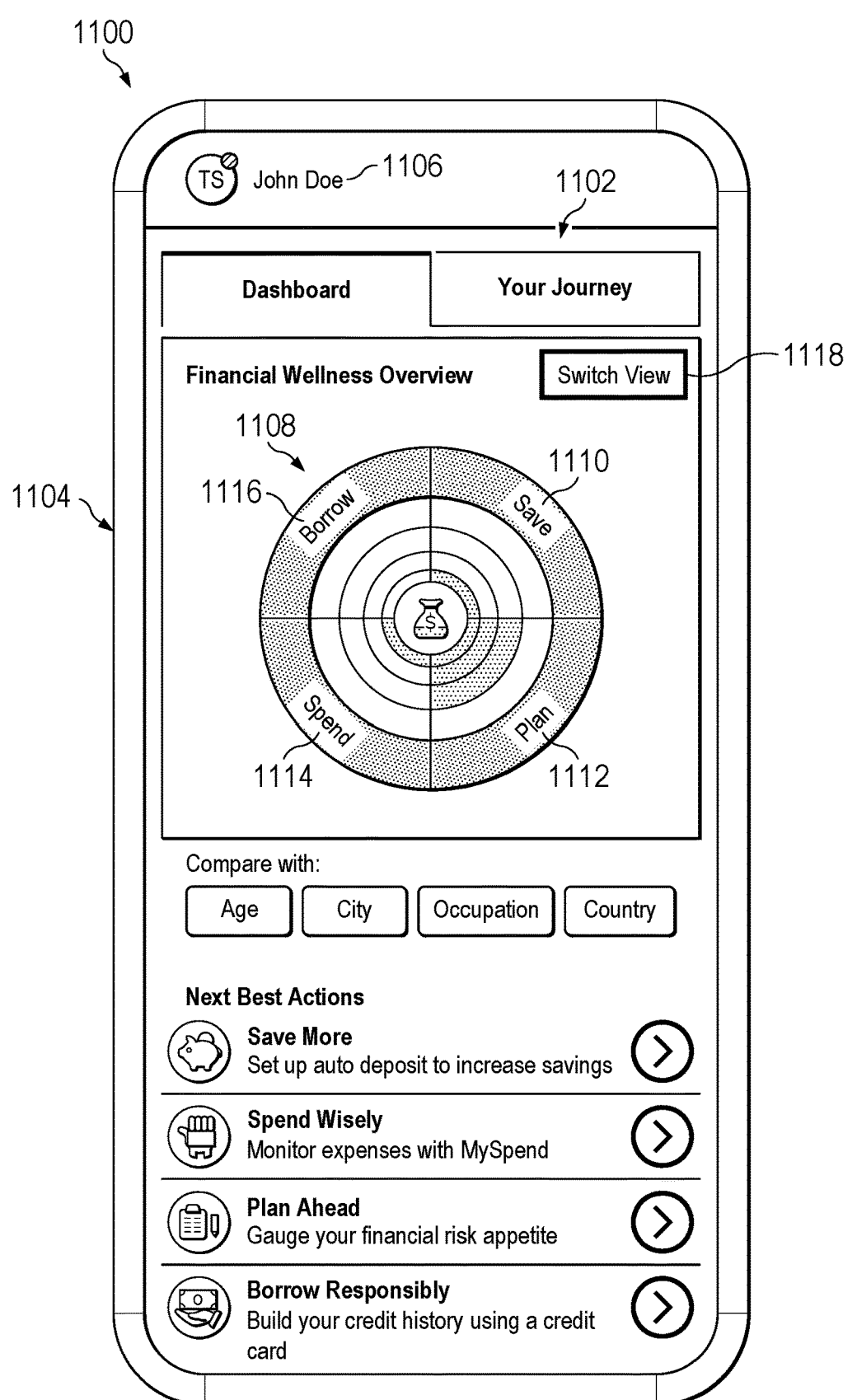

FIG. 11 is a diagram 1100 that illustrates the displaying of an example user interface 1102 of an example application on a user device 1104 of a user 1106. The user interface 1102 includes a visual 1108 that presents a different view of financial well-being of the user 1106 than the visual 1006 of the user interface 1002. For example, the visual 1108 is represented as a circle with different wedges 1110, 1112, 1114, and 1116 representing different savings, planning, spending, and borrowing categories, respectively. Highlighted arcs within a respective wedge can indicate progress towards financial resiliency for a corresponding category. Progress for a category can correspond to a number of or percentage of completed recommended actions within a respective category, or a corresponding categorical resiliency score which may be in one of a set of predefined buckets (e.g., financially-vulnerable, financially-coping, approaching-resilience, and financially-resilient). For example, the wedges 1110 and 1114 corresponding to the savings and spending categories each include a single highlighted arc within the respective wedge, which can indicate, for example, a progress level of financially-coping for the respective category. As another example, the wedge 1112 corresponding to the planning category has three highlighted arcs within the wedge 1112, which can indicate that the user 1106 has achieved a level of approaching-resilience for the planning category. As yet another example, the wedge 1116 for the borrowing category has no highlighted arcs, which can indicate that the user 1106 has a level of financial vulnerability for the borrowing category. The user interface 1102 includes a switch-view button 1118 that, when selected, can result in replacement of the user interface 1102 in the application with a different user interface such one of the interfaces described below with respect to FIGS. 12-13 or the user interface 1002 of FIG. 10.

Figure 12:
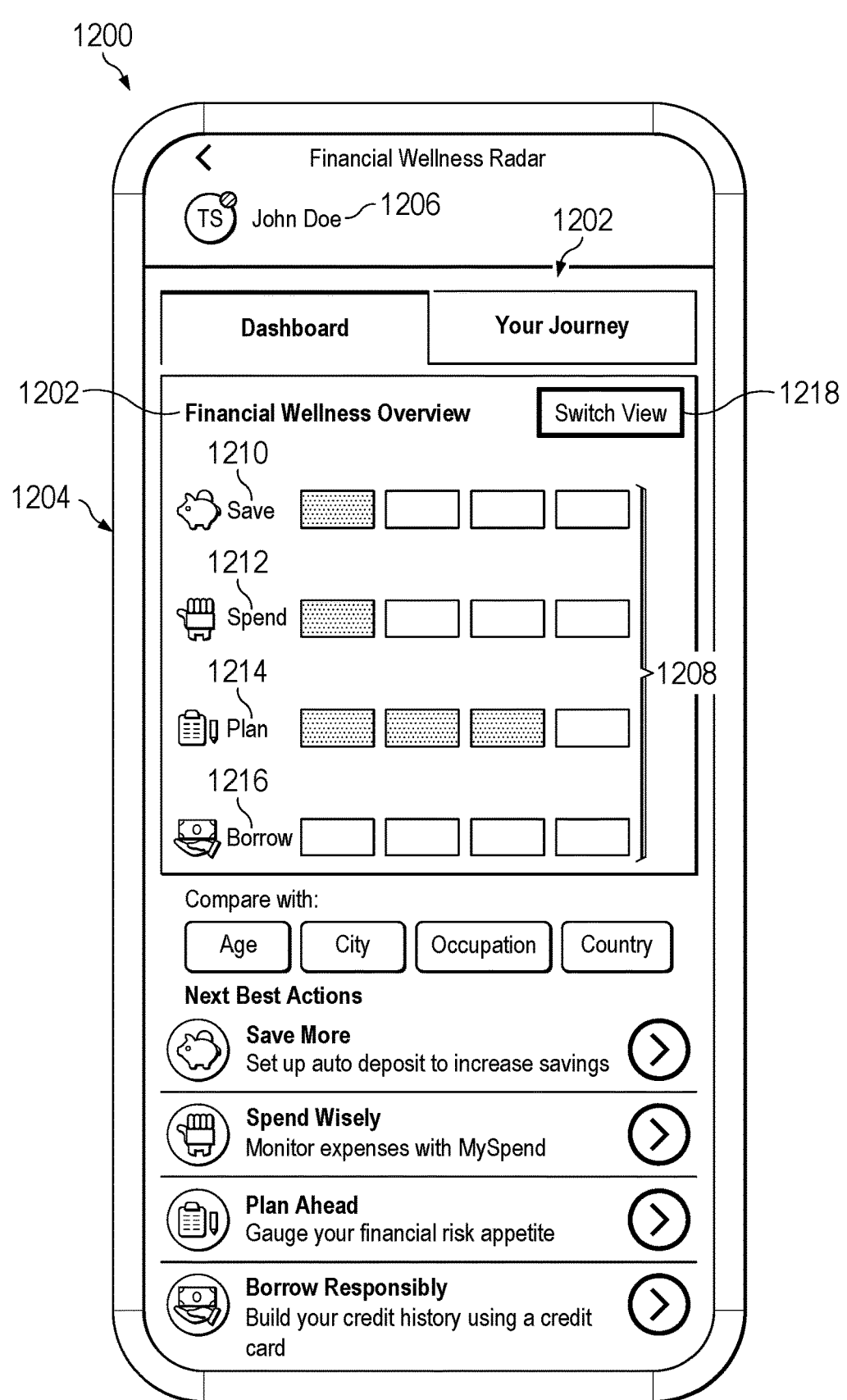

FIG. 12 is a diagram 1200 that illustrates the displaying of an example user interface 1202 of an example application on a user device 1204 of a user 1206. The user interface 1202 includes a visual 1208 that presents a horizontal bar-chart view of financial well-being of the user 1206. For example, the visual 1208 includes a horizontal bar for each of savings 1210, spending 1212, planning 1214, and borrowing 1216 categories. Relative financial well-being in a respective category can be illustrated in the visual 1208 by a varying number of highlighted cells in a horizontal bar for the category. For instance, the horizontal bars corresponding to the savings category 1210 and the spending category 1212 each include a single highlighted cell within the respective horizontal bar, which can indicate, for example, a progress level of financially-coping for the respective category. As another example, the horizontal bar corresponding to the planning category 1214 has three highlighted cells, which can indicate that the user 1206 has achieved a level of approaching-resilience for the planning category 1214. As yet another example, the horizontal bar for the borrowing category 1216 has no highlighted cells, which can indicate that the user 1206 has a level of financial vulnerability for the borrowing category 1216. The user interface 1202 includes a switch-view button 1218 that, when selected, can cause replacement of the user interface 1202 in the application with a different user interface such the interface described below with respect to FIG. 13, the user interface 1002 of FIG. 10, or the user interface 1102 of FIG. 11.

Figure 13:
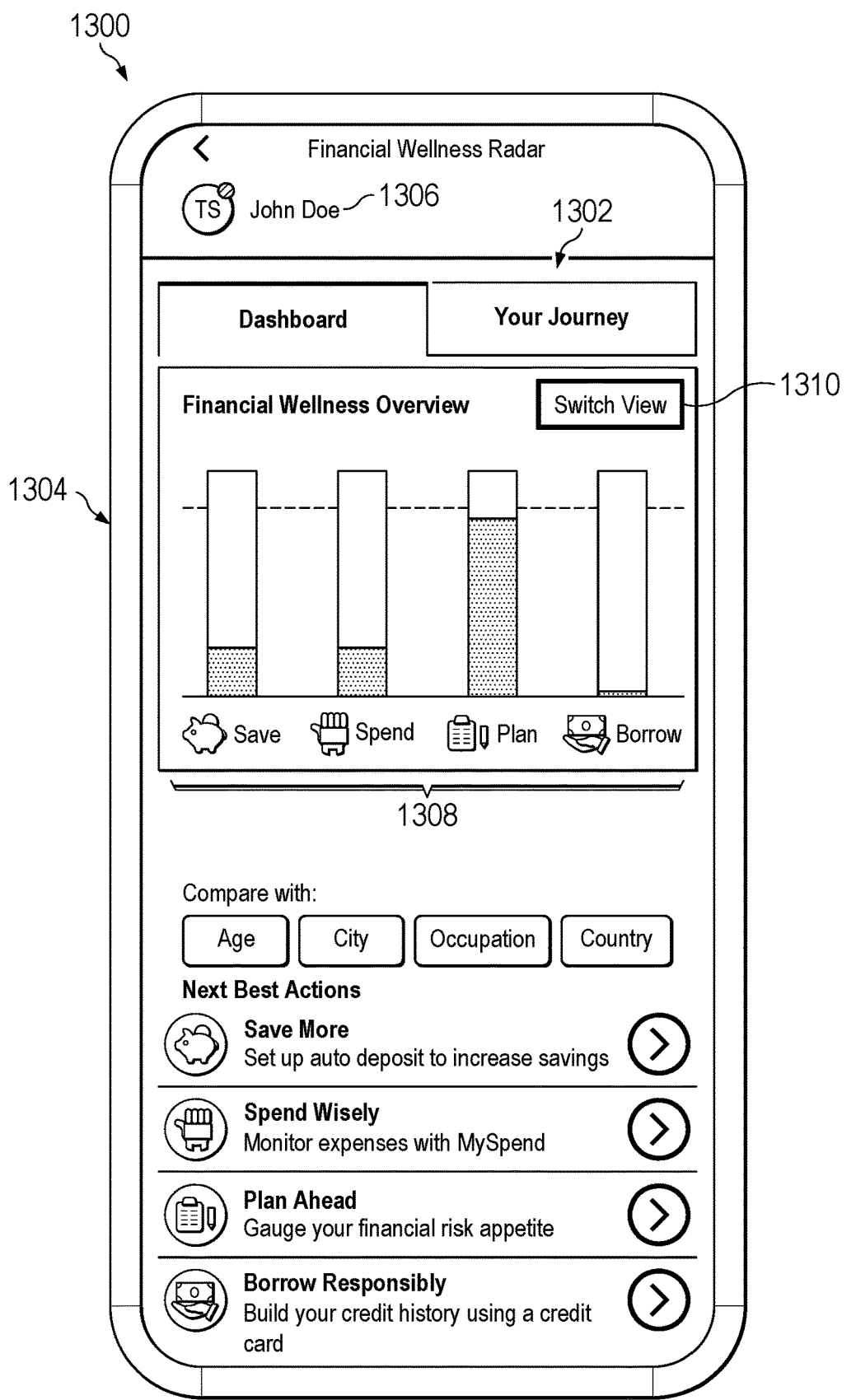

FIG. 13 is a diagram 1300 that illustrates the displaying of an example user interface 1302 of an example application on a user device 1304 of a user 1306. The user interface 1302 includes a visual 1308 that presents a vertical bar-chart view of financial well-being of the user 1306. For example, the visual 1308 includes a vertical bar for each of savings, spending, planning, and borrowing categories. Relative financial well-being in a respective category can be illustrated in the visual 1308 by a varying degree of highlight (e.g., coloring) in a vertical bar for the category. For instance, the vertical bars corresponding to the savings category and the spending category each include approximately 25% shading, which can indicate, for example, a progress level of financially-coping for the respective category. As another example, the vertical bar corresponding to the planning category has a majority of the vertical bar color-filled, which can indicate that the user 1306 has achieved a level of approaching-resilience for the planning category 1314. As yet another example, the vertical bar for the borrowing category is approximately 90% uncolored, which can indicate that the user 1306 has a level of financial vulnerability for the borrowing category. The user interface 1302 includes a switch-view button 1318 that, when selected, can cause replacement of the user interface 1302 in the application with a different user interface such one of the interfaces described above with respect to FIGS. 10-12.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
at least one memory storing instructions;
a network interface; and
at least one hardware processor interoperably coupled with the network interface and the at least one memory, wherein execution of the instructions by the at least one hardware processor causes performance of operations comprising:
establishing secure communication channels with a plurality of systems where data for a user is stored;
receiving, via the secure communication channels and from the plurality of systems, user data for one or more categories in a plurality of categories;
for each category:
applying a set of rules to the user data for the category to generate a resiliency score for the category for the user; and
generating, based at least on a comparison of the resiliency score to a threshold resiliency score for the category, a set of recommended actions for the user to achieve the threshold resiliency score for the category; and
providing, for display on a client device associated with the user, a dynamic user interface that uses the resiliency scores and the sets of recommended actions to display an interactive resiliency visual with which the user can interact.

2. The system of claim 1, the operations comprising:
receiving, from the dynamic user interface, a selection of a recommended action;
transmitting, in response to receiving the selection of the recommended action, from the client device and to a particular system, a request to perform a system action corresponding to the selected recommended action, wherein the transmitting is performed over a pre-existing secure communication channel; and
receiving, from the particular system, a confirmation that the system action has been completed wherein the confirmation includes data corresponding to the system action.

3. The system of claim 2, the operations comprising:
computing, in response to receiving the confirmation that the system action has been completed, updated resiliency scores and updated sets of recommended actions for respective categories; and
dynamically updating the dynamic user interface based on the updated resiliency scores and updated sets of recommended actions.

4. The system of claim 1, wherein the dynamic user interface includes a series of user interfaces, comprising:
a first user interface including a graphical visualization of a holistic well-being of the user in the plurality of categories;
a second user interface including information corresponding to subcategories for a particular category; and
a third user interface including information including the set of recommendations for achieving well-being in the particular category.

5. The system of claim 4, wherein:
the second user interface is activated and presented upon a received user selection of a particular category in the graphical visualization including the plurality of categories; and
the third user interface is activated and presented upon a received user selection of a particular subcategory from among subcategories for the particular category.

6. The system of claim 4, wherein the first user interface comprises a plurality of category symbols displaced around a shape with multiple vertices, wherein the closer a respective vertex is to a respective category symbol, the higher a wellbeing of the user in a respective category corresponding to the category symbol.

7. The system of claim 1, wherein the plurality of categories comprise a plurality of financial categories.

8. The system of claim 7, wherein the plurality of financial categories comprises spending, savings, borrowing, and planning.

9. The system of claim 1, wherein applying a set of rules to the user data for the category to generate a resiliency score for the category for the user includes using machine learning models.

10. A computer-implemented method, comprising:
establishing secure communication channels with a plurality of systems where data for a user is stored;

receiving, via the secure communication channels and from the plurality of systems, user data for one or more categories in a plurality of categories;

for each category:

applying a set of rules to the user data for the category to generate a resiliency score for the category for the user; and generating, based at least on a comparison of the resiliency score to a threshold resiliency score for the category, a set of recommended actions for the user to achieve the threshold resiliency score for the category; and providing, for display on a client device associated with the user, a dynamic user interface that uses the resiliency scores and the sets of recommended actions to display an interactive resiliency visual with which the user can interact.

11. The computer-implemented method of claim 10, further comprising:

receiving, from the dynamic user interface, a selection of a recommended action;

transmitting, in response to receiving the selection of the recommended action, from the client device and to a particular system, a request to perform a system action corresponding to the selected recommended action, wherein the transmitting is performed over a pre-existing secure communication channel; and receiving, from the particular system, a confirmation that the system action has been completed wherein the confirmation includes data corresponding to the system action.

12. The computer-implemented method of claim 11, further comprising:

computing, in response to receiving the confirmation that the system action has been completed, updated resiliency scores and updated sets of recommended actions for respective categories; and dynamically updating the dynamic user interface based on the updated resiliency scores and updated sets of recommended actions.

13. The computer-implemented method of claim 10, wherein the dynamic user interface includes a series of user interfaces, comprising:

a first user interface including a graphical visualization of a holistic well-being of the user in the plurality of categories;

a second user interface including information corresponding to subcategories for a particular category; and a third user interface including information including the set of recommendations for achieving well-being in the particular category.

14. The computer-implemented method of claim 13, wherein:

the second user interface is activated and presented upon a received user selection of a particular category in the graphical visualization including the plurality of categories; and the third user interface is activated and presented upon a received user selection of a particular subcategory from among subcategories for the particular category.

15. The computer-implemented method of claim 13, wherein the first user interface comprises a plurality of category symbols displaced around a shape with multiple vertices, wherein the closer a respective vertex is to a respective category symbol, the higher a wellbeing of the user in a respective category corresponding to the category symbol.

16. The computer-implemented method of claim 10, wherein the plurality of categories comprise a plurality of financial categories.

17. The computer-implemented method of claim 16, wherein the plurality of financial categories comprises spending, savings, borrowing, and planning.

18. A non-transitory, computer-readable medium storing computer-readable instructions, that upon execution by at least one hardware processor, cause performance of operations, comprising:

establishing secure communication channels with a plurality of systems where data for a user is stored;

receiving, via the secure communication channels and from the plurality of systems, user data for one or more categories in a plurality of categories;

for each category:

applying a set of rules to the user data for the category to generate a resiliency score for the category for the user; and generating, based at least on a comparison of the resiliency score to a threshold resiliency score for the category, a set of recommended actions for the user to achieve the threshold resiliency score for the category; and providing, for display on a client device associated with the user, a dynamic user interface that uses the resiliency scores and the sets of recommended actions to display an interactive resiliency visual with which the user can interact.

19. The computer-readable medium of claim 18, the operations comprising:

receiving, from the dynamic user interface, a selection of a recommended action;

transmitting, in response to receiving the selection of the recommended action, from the client device and to a particular system, a request to perform a system action corresponding to the selected recommended action, wherein the transmitting is performed over a pre-existing secure communication channel; and receiving, from the particular system, a confirmation that the system action has been completed wherein the confirmation includes data corresponding to the system action.

20. The computer-readable medium of claim 19, the operations comprising:

computing, in response to receiving the confirmation that the system action has been completed, updated resiliency scores and updated sets of recommended actions for respective categories; and dynamically updating the dynamic user interface based on the updated resiliency scores and updated sets of recommended actions.

* * * * *